(12) United States Patent
Smirnova et al.

(10) Patent No.: US 11,808,471 B2
(45) Date of Patent: Nov. 7, 2023

(54) PROVISIONING WIRELESS MESH NETWORKS FOR HEATING, VENTILATION, AND AIR CONDITIONING SYSTEMS

(71) Applicant: Lennox Industries Inc., Richardson, TX (US)

(72) Inventors: Elena Smirnova, Plano, TX (US); Mansoor Ahmed, Parker, TX (US)

(73) Assignee: Lennox Industries Inc., Richardson, TX (US)

( * ) Notice: Subject to any disclaimer, the term of this patent is extended or adjusted under 35 U.S.C. 154(b) by 431 days.

(21) Appl. No.: 17/005,655

(22) Filed: Aug. 28, 2020

(65) Prior Publication Data

US 2022/0065482 A1 Mar. 3, 2022

(51) Int. Cl.
*H04L 41/08* (2022.01)
*F24F 11/56* (2018.01)
*F24F 11/30* (2018.01)
*H04W 12/06* (2021.01)
(Continued)

(52) U.S. Cl.
CPC .............. *F24F 11/56* (2018.01); *F24F 11/30* (2018.01); *H04L 41/08* (2013.01); *H04W 12/068* (2021.01); *H04W 84/12* (2013.01); *H04W 84/18* (2013.01)

(58) Field of Classification Search
CPC ...... H04L 41/08; H04W 84/18; H04W 12/068
See application file for complete search history.

(56) References Cited

U.S. PATENT DOCUMENTS

| 8,538,584 B2 * | 9/2013 | Pandey ................... H04L 67/12 700/277 |
| 9,054,961 B1 | 6/2015 | Kim et al. |
| 9,554,345 B2 * | 1/2017 | Rosen ................. H04W 72/082 |

(Continued)

FOREIGN PATENT DOCUMENTS

WO WO-2017090888 A1 * 6/2017 ............. H04L 12/10

OTHER PUBLICATIONS

Smirnova, E. et al., "Integrating Network Devices With a Provisioned Mesh Network for Heating, Ventilation, and Air Conditioning Systems," U.S. Appl. No. 17/005,860, filed Aug. 28, 2020, 56 pages.

(Continued)

*Primary Examiner* — Oanh Duong
(74) *Attorney, Agent, or Firm* — Baker Botts L.L.P.

(57) ABSTRACT

A system that includes a plurality of controllers that are each controller is configured to operate at least a portion of a Heating, Ventilation, and Air Conditioning (HVAC) system. The plurality of controllers are members of an unprovisioned mesh network. The system further includes a network provisioning device that is configured to establish a peer-to-peer connection with the controller. The device is further configured send a request to the controller to identify a wireless network that is in range of one or more controllers that are members of the unprovisioned mesh network and to obtain network credentials for the identified wireless network. The network device is further configured to send the network credentials to the controller to join a provisioned mesh network. The controller is configured to propagate the network credentials to other controllers within the unprovisioned mesh network.

20 Claims, 19 Drawing Sheets

(51) Int. Cl.
  *H04W 84/12*     (2009.01)
  *H04W 84/18*     (2009.01)

(56)     References Cited

U.S. PATENT DOCUMENTS

| | | | |
|---|---|---|---|
| 10,417,888 | B2* | 9/2019 | Emmanuel ........ H04W 72/0453 |
| 11,343,312 | B2* | 5/2022 | Linsky ................ H04L 67/1059 |
| 2016/0373917 | A1 | 12/2016 | Logue et al. |
| 2017/0094494 | A1 | 3/2017 | Douglas et al. |
| 2018/0338290 | A1* | 11/2018 | Tashiro .................... F24F 11/89 |
| 2021/0037387 | A1* | 2/2021 | Kharvar ................ H04L 9/3242 |

OTHER PUBLICATIONS

European Patent Office, Extended European Search Report, Application No. 21192270.3, dated Jan. 14, 2022, 13 pages.

* cited by examiner

PROVISIONING WIRELESS MESH NETWORKS FOR HEATING, VENTILATION, AND AIR CONDITIONING SYSTEMS

TECHNICAL FIELD

The present disclosure relates generally to Heating, Ventilation, and Air Conditioning (HVAC) systems, and more specifically to provisioning wireless mesh networks for HVAC systems.

BACKGROUND

Providing connectivity to roof-top units (RTUs) of a Heating, Ventilation, and Air Conditioning (HVAC) system at a worksite can pose several technical challenges. For example, some worksites may employ hundreds or thousands of RTUs. Each RTU will need to be configured to form a mesh network for a worksite. In existing systems, this process typically involves individually connecting to each of the RTUs to configure the RTUs to form a mesh network. The amount of time required for this process increases as the number of RTUs at a worksite increases. This process results in a significant amount of setup time for configuring all of the RTUs at the worksite which introduces delays and downtime for the HVAC system.

RTUs are typically distributed through a worksite. This poses another technical challenge when configuring RTUs at a worksite. The physical location of an RTU at a worksite dictates how well an RTUs is able to communicate with other devices at the worksite. For example, an RTU may be out of range to communicate with some devices at a worksite. Configuring a large mesh network poses another technical challenge because the performance of a mesh network degrades as the size of the mesh network increases. As the size of the mesh network increases, the number of hops for sending data within the mesh network increases which introduces delays that reduce the speed and throughput of the mesh network.

SUMMARY

The system disclosed in the present application provides a technical solution to the technical problems discussed above by using some controllers as temporary gateways for provisioning other controllers to form a mesh network. The disclosed system provides several practical applications and technical advantages which include a process for communicating with a subset of controllers at a worksite to configure a large number of controllers to establish a mesh network. This process reduces the number of controllers that need to be individually connected to, and thereby, reduces the amount of time required to set up a mesh network. This process also considers a controller's ability to communicate with other devices when joining a mesh network. For example, a controller can be configured to join either an existing mesh network or to form a new mesh network based on the signal strength between the controller and other devices (e.g. other controllers and access points). This process improves the speed and throughput of the system by configuring controllers to form mesh networks with other devices using the best available connections.

In one embodiment, a Heating, Ventilation, and Air Conditioning (HVAC) network provisioning system includes an HVAC system that is configured to control a temperature within a space and a plurality of controllers that are each controller is configured to operate at least a portion of the HVAC system. A controller may be integrated with or configured to work with a roof-top unit (RTU) for the HVAC system. The system further includes a network provisioning device that is configured to configure a set of controllers at a worksite to form a provisioned mesh network. A provisioned mesh network is a mesh network that is associated with a local area network for the worksite. By forming a provisioned mesh network, the controllers are able to communicate with each other and other devices at the worksite using the local area network. This allows the controllers to work cooperatively with each other to control the HVAC system. This process comprises identifying a controller from among the members of an unprovisioned mesh network at a worksite. An unprovisioned mesh network is a mesh network that is not associated with a local area network. Controllers that are members of an unprovisioned mesh network can only communicate with each other and are unable to communicate with other devices that are connected to the local access network. This process further involves establishing a peer-to-peer connection (e.g. Bluetooth) with the controller and identifying a wireless network that is in range of one or more of the controllers from among the unprovisioned mesh network. The wireless network may be a wireless network that is associated with the local access network or an existing provisioned mesh network. The process further includes obtaining network credentials for the identified wireless network and sending the network credentials to the controller to join a provisioned mesh network. The controller also is configured to propagate the network credentials to other controllers within the unprovisioned mesh network which allows the other controllers to also join the provisioned mesh network.

In another embodiment, the Heating, Ventilation, and Air Conditioning (HVAC) network provisioning system includes a network provisioning device that is configured to configure add a new controller to an existing provisioned mesh network. For example, a new controller may be added to a worksite to expand the coverage and capabilities of the system. This process includes establishing a peer-to-peer connection with a new controller. In this case, the new controller is not yet associated with any wireless networks. The process further includes identifying a wireless network that is associated with the local area network and that is in range of the controller. The process further includes obtaining network credentials for the identified wireless network and sending the network credentials to the controller to join the provisioned mesh network. The controller is configured to use the network credentials to join a provisioned mesh network.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
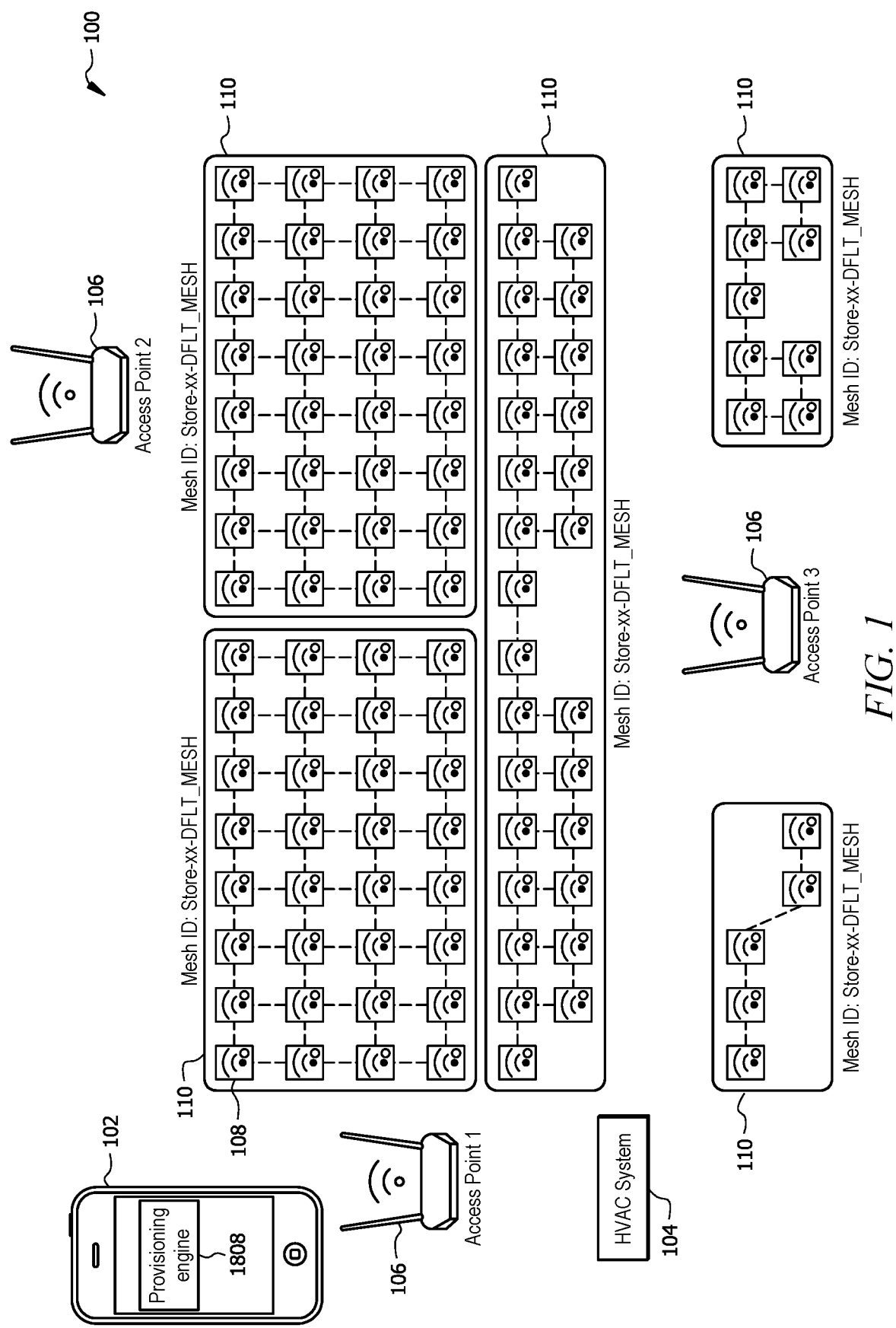
FIG. 1 is a schematic diagram of a wireless network system for heating, ventilation, and air conditioning (HVAC) systems.

FIG. 1 is a schematic diagram of a wireless network system 100 for heating, ventilation, and air conditioning (HVAC) systems 104. In one embodiment, the system 100 comprises a network provisioning device 102, one or more HVAC systems 104, one or more access points 106, and a plurality of controllers 108. The network provisioning device 102, the one or more access points 106, and the plurality of controllers 108 are in signal communication with each other using one or more network connections. The system 100 may be configured as shown or in any other suitable configuration.

The network connections may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network connections may be configured to support any suitable type of communication protocol as would be appreciated by one of ordinary skill in the art.

HVAC System

An HVAC system 104 is generally configured to control the temperature of a space. Examples of a space include, but are not limited to, a room, a home, an apartment, a mall, an office, or a building. The HVAC system 104 may comprise a thermostat, compressors, blowers, evaporators, condensers, and/or any other suitable type of hardware for controlling the temperature of the space. An example of an HVAC system 104 configuration and its components are described below in FIG. 19. Although FIG. 1 illustrates a single HVAC system 104, a location or space may comprise a plurality of HVAC systems 104 that are configured to work together. For example, a large building may comprise multiple HVAC systems 104 that work cooperatively to control the temperature within the building.

Access Points

An example of an access point 106 is a wired or wireless router. An access point 106 is generally configured to provide networking capabilities to the controllers 108. For example, an access point 106 may be configured to allow controllers 108 to communicate with each other using a local area network. An access point 106 may also allow controllers 108 to communicate with other controllers 108, network devices, and networks using a local area network for a worksite. The access points 106 are distributed at a worksite to provide coverage for different parts of a building or space.

Controllers

A controller 108 is generally configured to control at least a portion of an HVAC system 104. For example, a controller 108 may be integrated within a portion of a roof-top unit (RTU) that is located on the roof of a building. Each controller 108 comprises a network interface that enables the controller 108 to communicate with the network provisioning device 102, access points 106, and components of the HVAC system 104. For example, a controller 108 may be configured to using Bluetooth to communicate with a network provisioning device 102 via a peer-to-peer connection. The controller 108 may also be configured to establish a wireless connection (e.g. a WIFI connection) with other controllers 108 and access points 106. In other examples, a controller 108 may be configured to use any other suitable type of wired or wireless communication techniques to communicate with other devices in the system 100.

In one embodiment, the controllers 108 may be configured by default to form one or more unprovisioned mesh networks 110 after being powered on. An unprovisioned mesh network 110 is a mesh network of controllers 108 that is not yet associated with a local area network. When a set of controllers 108 are configured as an unprovisioned mesh network 110, the controllers 108 are able to communicate with each other but are unable to communicate with other controllers 108 or network devices that are not members of the unprovisioned mesh network 110.

Controllers 108 may be configured by the network provisioning device 102 to form a provisioned mesh network 112. A provisioned mesh network 112 is a mesh network of controllers 108 that is associated with a local area network for the worksite. When a set of controllers 108 are configured as a provisioned mesh network 112, the controllers 108 are able to securely communicate with each other and other controllers 108 or network devices that are members of the local area network.

In one embodiment, a controller 108 may be configured to use visual indicators to indicate a connectivity status for the controller 108. For example, a controller 108 may comprise one or more light-emitting diodes (LEDs) that indicate a connectivity status for the controller 108. In this example, a solid green light may indicate that the controller 108 is connected to the Internet or an Intranet. A blinking green light may indicate that the controller 108 is a member of a provisioned mesh network 112 without an Internet connection. A blinking yellow light may indicate that the controller 108 is a member of an unprovisioned mesh network 110. A blinking red light may indicate that the controller 108 has lost connectivity. A solid red light may indicate the controller 108 has an error. In other examples, a controller 108 may use any other suitable color or technique for indicating a connectivity status for the controller 108.

Network Provisioning Device

Examples of a network provisioning device 102 include, but are not limited to, a laptop, a computer, a tablet, a smartphone, or any other suitable type of computing device. The network provisioning device 102 comprises a provisioning engine 1808 that is generally configured to configure controllers 108 to form or join provisioned mesh networks 112. Examples of the provisioning engine 1808 in operation are described in FIGS. 2 and 13. Additional information about the hardware configuration of the network provisioning device 102 is described in FIG. 18.

Wireless Mesh Network Provisioning Process

Figure 2:
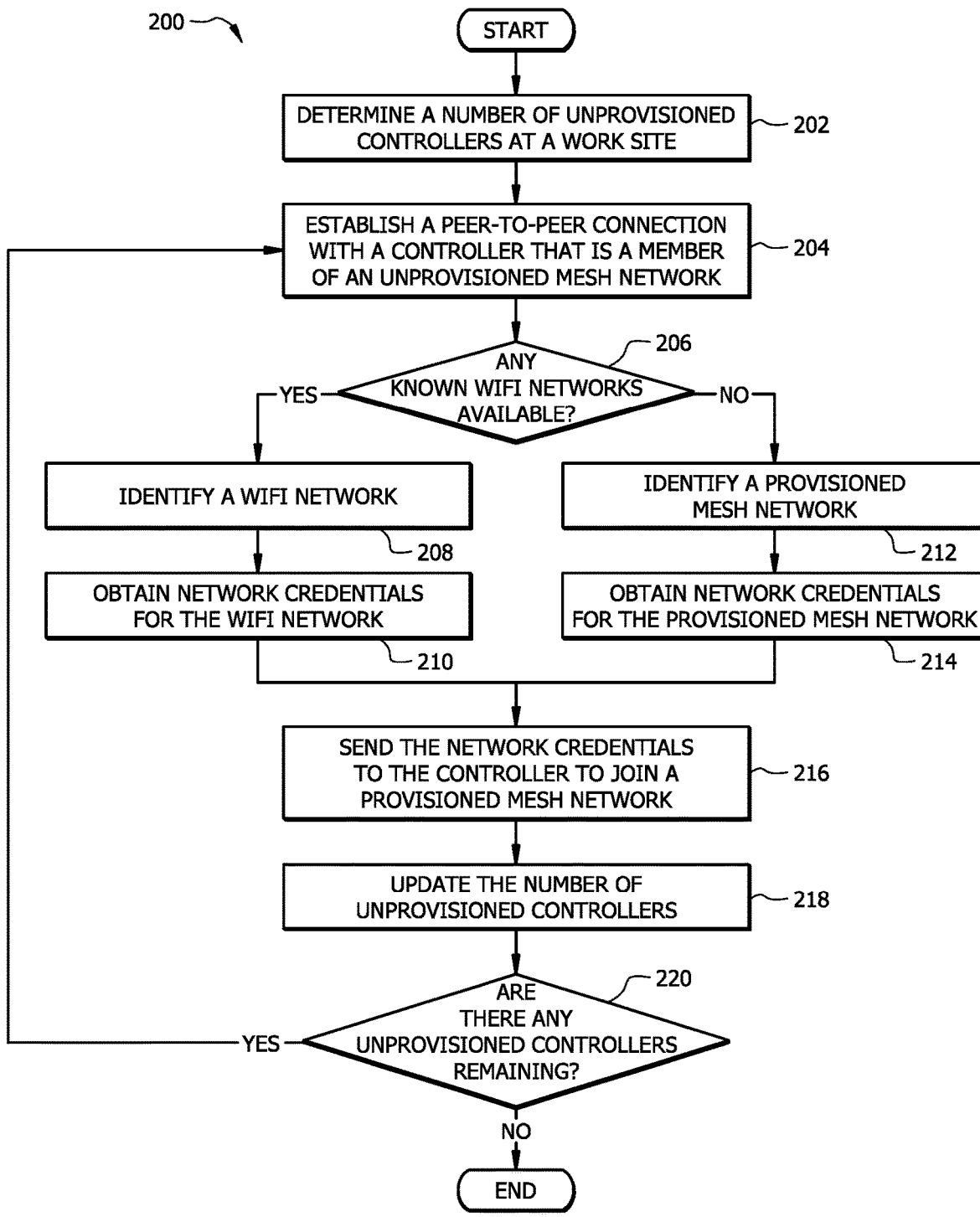
FIG. 2 is a flowchart of an embodiment of a wireless mesh network provisioning method.

FIG. 2 is a flowchart of an embodiment of a wireless mesh network provisioning method 200. In one embodiment, the network provisioning device 102 may employ method 200 to configure multiple controllers 108 to switch from an unprovisioned mesh network 110 to a provisioned mesh network 112. As an example, numerous controllers 108 may be installed at a worksite that is located on the roof of a building. The controllers 108 by default will join and create one or more unprovisioned mesh networks 110 after being powered on. In this example, the network provisioning device 102 may use method 200 to add the controllers 108 to one or more provisioned mesh networks 112 for the worksite. Existing solutions may involve individually connecting to all of the controllers 108 to form a mesh network. In contrast, method 200 provides a process that reduces the number of controllers 108 that a network provisioning device 102 has to connect with to establish a provisioned mesh network 112 which also reduces the amount of time required to configure a large number of controllers 108. This means that the network provisioning device 102 may only connect to a subset of the controllers 108 at a worksite to configure the entire worksite. Thus, this process improves the performance of the system by reducing the amount of setup time and downtime for the system.

At step 202, the provisioning engine 1808 determines the number of unprovisioned controllers 108 that are located at a worksite. For example, the provisioning engine 1808 may present a technician with a graphical user interface that prompts the technician to enter the number of controllers 108 that are members of unprovisioned mesh networks 110. In this example, the provisioning engine 1808 receives a user input from the technician that identifies a number of unprovisioned controllers 108. The provisioning engine 1808 uses the number of unprovisioned controllers 108 to keep track of how many controllers 108 need to be configured at a worksite. Referring to FIG. 1 as an example, a technician may be at a worksite on the roof of a building where a plurality of controllers 108 have formed multiple unprovisioned mesh networks 110. In this example, there are one hundred and six controllers 108 that are split between five different unprovisioned mesh networks 110. When prompted by the provisioning engine 1808, the technician will indicate that there are one hundred and six unprovisioned controllers 108.

Figure 3:
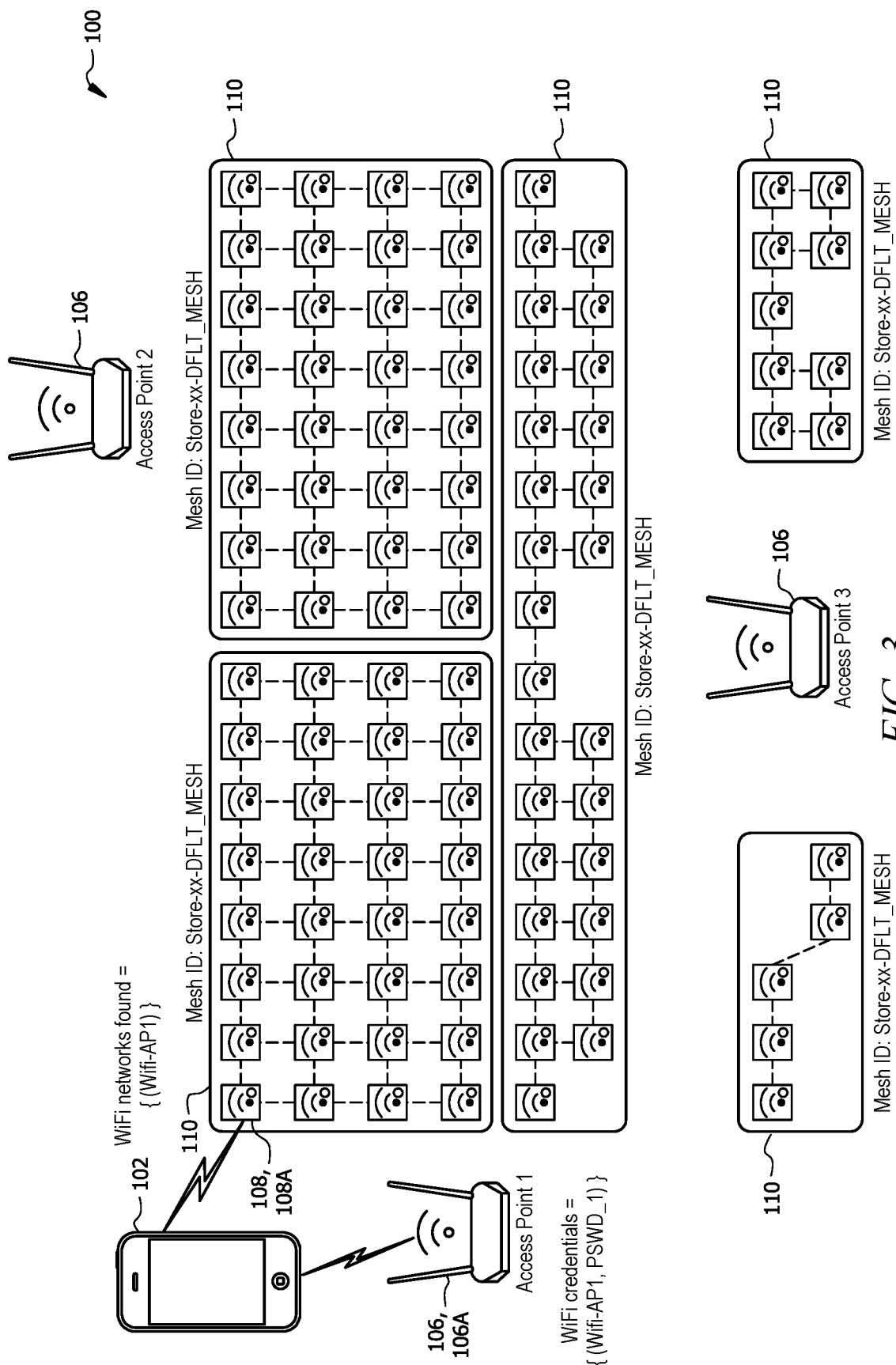
FIGS. 3-12 are an example of the wireless mesh network provisioning process.

Returning to FIG. 2 at step 204, the provisioning engine 1808 establishes a peer-to-peer connection with a controller 108 that is a member of an unprovisioned mesh network 110. Referring to the example in FIG. 3, the provisioning engine 1808 establishes a peer-to-peer connection (e.g. a Bluetooth connection) with one of the controllers 108A in an unprovisioned mesh network 110. For example, the technician may approach and establish a peer-to-peer connection with one of the controllers 108A that has a yellow blinking indicator which indicates that the controller 108A is a member of an unprovisioned mesh network 110. After the peer-to-peer connection is established, the controller 108A acts as a temporary gateway for communicating with other controllers 108 within the unprovisioned mesh network 110.

Returning to FIG. 2 at step 206, the provisioning engine 1808 determines whether there are any known or trusted wireless networks available. Here, the provisioning engine 1808 may send a request to the controller 108A to query the controllers 108 in the unprovisioned mesh network 110 to identify the wireless networks that are in range of the controllers 108. Each controller 108 will determine which wireless networks are in range of the controller 108 and send a list of wireless networks back to the controller 108A. The controller 108A will aggregate the list of available wireless networks from the controllers 108 in the unprovisioned mesh network 110 and provide the list of wireless networks to the provisioning engine 1808. The provisioning engine 1808 may then determine whether any of the available wireless networks match a known wireless network that is associated with a local area network for the worksite. For instance, the provisioning engine 1808 may compare identifiers for the available wireless networks to a set of network identifiers 1812 for known or trusted wireless networks. The provisioning engine 1808 determines that there is a known wireless network in range of the controller 108A when one of the known network identifiers 1812 matches one of the available wireless network identifiers. Otherwise, the provisioning engine 1808 determines that there are not any known or trusted wireless networks in range of the controller 108A when a match is not found.

The provisioning engine 1808 proceeds to step 208 in response to determining that one or more known wireless networks is available. At step 208, the provisioning engine 1808 identifies the wireless networks from the set of known wireless networks that are in range of the controllers 108 in the unprovisioned mesh network 110. Returning to the example in FIG. 3, the provisioning engine 1808 may determine that a wireless network (shown as WiFi-AP1) associated with a first access point 106A is in range of the controllers 108 in the unprovisioned mesh network 110. The provisioning engine 1808 may display a list of the available known wireless networks to the technician using a graphical user interface. Returning to FIG. 2 at step 210, the provisioning engine 1808 obtains network credentials 1814 for the identified wireless networks. In one embodiment, the provisioning engine 1808 may prompt the technician to provide network credentials 1814 (e.g. log-in credentials) to join the identified wireless network. For example, the provisioning engine 1808 may prompt the technician for network credentials 1814 using a graphical user interface. The provisioning engine 1808 receives a user input from the technician that includes the network credentials 1814 for joining the identified wireless network. For example, the technician may provide the network credentials 1814 for one or more of the access points 106 to use for joining a wireless network.

In another embodiment, the provisioning engine 1808 may obtain the network credentials 1814 from memory (e.g. memory 1804). For example, provisioning engine 1808 may have previously stored network credentials 1814 for wireless networks that are associated with the local area network for the worksite. In this case, the provisioning engine 1808 may use the network identifier 1812 for the identified wireless network to look-up network credentials 1814 for joining the identified wireless networks.

Returning to step 206, the provisioning engine 1808 proceeds to step 212 in response to determining that a known wireless network is not available. When the provisioning engine 1808 is unable to find a known wireless network that is in range of the controllers 108 in the unprovisioned mesh network 110, the provisioning engine 1808 may determine whether there are any existing provisioned mesh networks 112 that are in range of the controllers 108 in the unprovisioned mesh network 110. By joining an existing provisioned mesh network 112, the controller 108 is able to communicate with other controllers 108 within the provisioned mesh network 112 to access the local area network. At step 212, the provisioning engine 1808 identifies one or more existing provisioned mesh networks 112 that are in range of the controllers 108 in the unprovisioned mesh network 110. For example, the provisioning engine 1808 may send a request to the controller 108A to query the controllers 108 in the unprovisioned mesh network 110 to identify any existing provisioned mesh networks 112 that are in range of the controllers 108. Each controller 108 will determine which provisioned mesh networks 112 are in range of the controller 108 and send a list of available provisioned mesh networks 112 back to the controller 108A. The controller 108A will aggregate the list of available provisioned mesh networks 112 from the controllers 108 in the unprovisioned mesh network 110 and provide the list of the provisioned mesh networks 112 to the provisioning engine 1808. In some embodiments, the controllers 108 in unprovisioned mesh network 110 may filter out unknown networks before sending the list of provisioned mesh networks 112 to the provisioning engine 1808. The provisioning engine 1808 may then determine whether any of the available provisioned mesh networks 112 matches a known provisioned mesh network 112 that is associated with the local area network for the worksite. For instance, the provisioning engine 1808 may compare identifiers for the available provisioned mesh networks 112 to a set of network identifiers 1812 for known or trusted provisioned mesh networks 112. The provisioning engine 1808 may display a list of the available provisioned mesh networks 112 to the technician using a graphical user interface. In some instances, the graphical user interface may identify the names of the available provisioned mesh networks 112. In other instances, the graphical user interface may not explicitly identify the names of the available provisioned mesh networks 112. In this case, the graphical user interface may generally indicate that one or more provisioned mesh networks 112 are available.

At step 214, the provisioning engine 1808 obtains network credentials 1814 for the provisioned mesh networks 112. The provisioning engine 1808 may obtain the network credentials 1814 from memory (e.g. memory 1804). In one embodiment, the provisioned mesh networks 112 are configured to use the same network credentials 1814 as the network credentials 1814 that are used to connect with an access point 106. For example, provisioned mesh networks 112 that are associated with the access point 106 may be configured to use the same network credentials 1814 as the access point 106. In this configuration, the provisioning engine 1808 may obtain the network credentials 1814 for the access points 106 from memory 1804 to use with the provisioned mesh networks 112.

In one embodiment, the provisioning engine 1808 may prompt the technician to provide network credentials 1814 (e.g. log-in credentials) to join the identified provisioned mesh network 112. For example, the provisioning engine 1808 may prompt the technician for network credentials 1814 using a graphical user interface. The provisioning engine 1808 receives a user input from the technician that includes the network credentials 1814 for joining the identified provisioned mesh network 112. For example, the technician may provide the network credentials 1814 for one or more of the access points 106 to use with the provisioned mesh networks 112. In this case, the provisioned mesh networks 112 may use the same network credentials 1814 as the credentials that are used for the access point 106 that they are connected to.

At step 216, the provisioning engine 1808 sends the network credentials 1814 to the controller 108 to join a provisioned mesh network 112. Here, the provisioning engine 1808 sends the controller 108 the network credentials 1814 which allows the controllers 108 to pass authentication with an access point 106 to join or form a provisioned mesh network 112. In other words, the controller 108 may use the received network credentials 1814 to authenticate itself to join the identified wireless network to form a provisioned mesh network 112 or to join the identified existing provisioned mesh network 112. The controller 108 becomes a member of a provisioned mesh network 112 for the local area network after joining the identified wireless network or the identified existing provisioned mesh network 112. Sending the network credentials 1814 to the controller 108 also triggers the controller 108 to propagate the network credentials 1814 to other controllers 108 within the unprovisioned mesh network 110. This allows the other controllers 108 to also join the provisioned mesh network 112. The controllers 108 may update their indicator to a solid or blinking green light to indicate that the controller 108 is a member of a provisioned mesh network 112.

Figure 4:
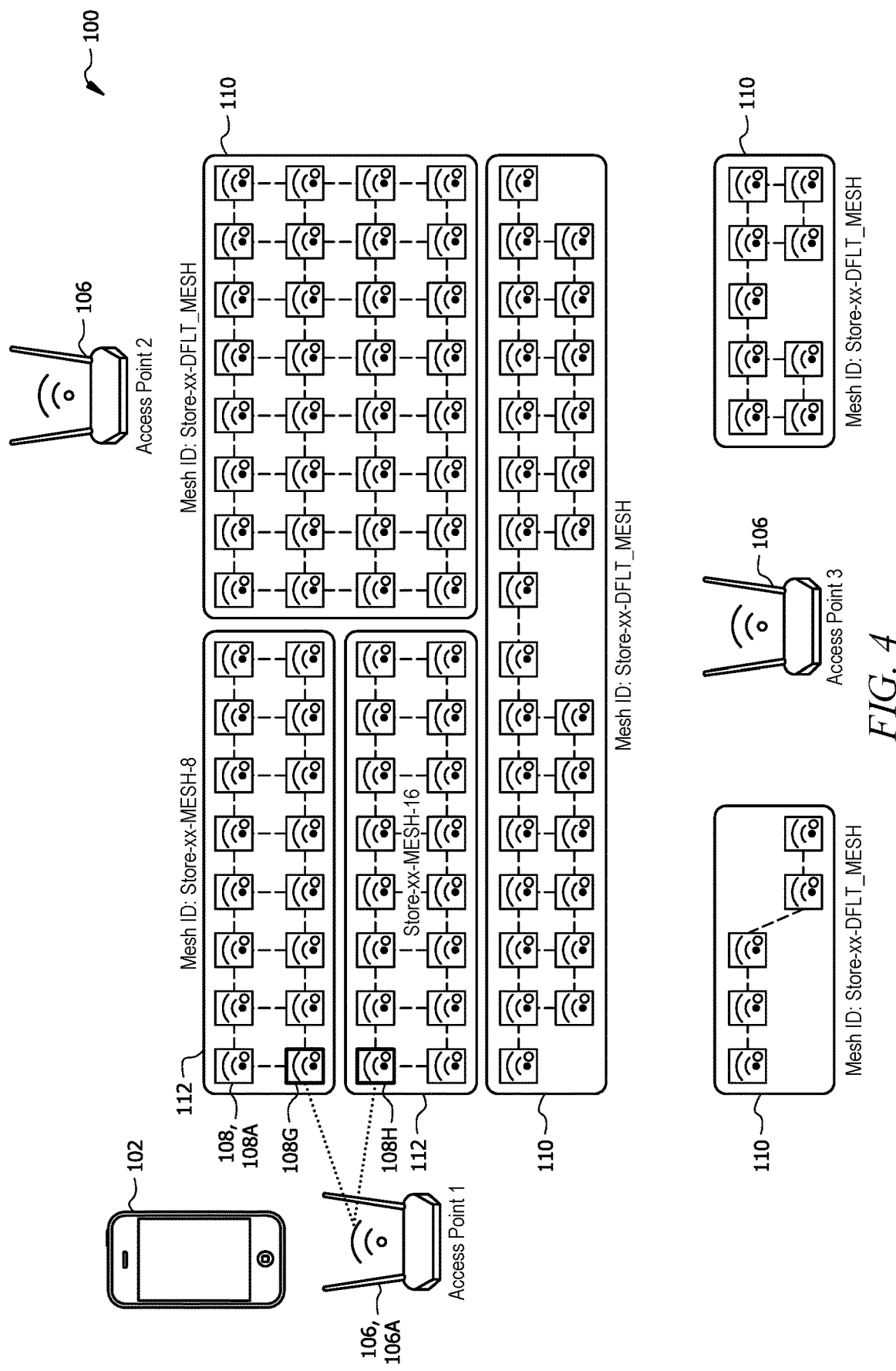

Referring to the example in FIG. 4, the controller 108A sends the network credentials 1814 to other controllers 108 using network connections within the unprovisioned mesh network 110 so that they can also use the network credentials 1814 to join the provisioned mesh network 112. For example, the controller 108A may use the unprovisioned mesh network 110 to distribute the network credentials 1814 to the other controllers 108 before leaving the unprovisioned mesh network 110. In this example, controllers 108G and 108H become gateway controllers since they are in range of the first access point 106A, and therefore, can be directly connected to the first access point 106A. Controllers 108G and 108H may each be responsible for forming their respective provisioned mesh networks 112.

Each provisioned mesh network 112 may be associated with its own unique identifier. For example, the provisioning engine 1808 may also send a site name that is associated with the worksite to the controller 108. The technician may provide a site name as an input to the provisioning engine 1808. Referring to the example in FIG. 4, an identifier for the provisioned mesh network 112 may comprise an identifier that references the controller 108 that is directly connected to the access point 106A as a gateway controller 108. For example, the provisioned mesh network 112 may comprise identifiers with a value of '8' and '9,' which correspond with controllers 108G and 108H, respectively. In response to receiving the identifier, the provisioning engine 1808 will send the identifier to the controllers 108 to associate the identifier with the provisioned mesh network 112. In this case, the provisioning engine 1808 sends the identifier to the controller 108 to trigger the controller 108 to store an association between the identifier and the provisioned mesh network 112. Returning to the example in FIG. 4, the controllers 108 will update the name of the provisioned mesh network 112 based on the identifier.

Returning to FIG. 2 at step 218, the provisioning engine 1808 updates the number of unprovisioned controllers 108. Here, the provisioning engine 1808 determines how many unprovisioned controllers 108 joined a provisioned mesh network 112 and removes these controllers 108 from the list of unprovisioned controllers 108. Returning to the example in FIG. 4, the provisioning engine 1808 may determine that thirty-two of the controllers 108 have joined a provisioning mesh network 112. In this example, the provisioning engine 1808 will update the number of unprovisioned controllers 108 by removing these thirty-two controllers 108 from the list of unprovisioned controllers 108. The provisioning engine 1808 determines that there are seventy-four unprovisioned controllers 108 remaining to be configured.

Returning to FIG. 2 at step 220, the provisioning engine 1808 determines whether there are any unprovisioned controllers 108 remaining. The provisioning engine 1808 determines that there are no more remaining unprovisioned controllers 108 when the number of unprovisioned controllers 108 is zero. Otherwise, the provisioning engine 1808 determines that there is at least one more unprovisioned controller 108 remaining when the number of unprovisioned controllers 108 is greater than zero.

Figure 5:
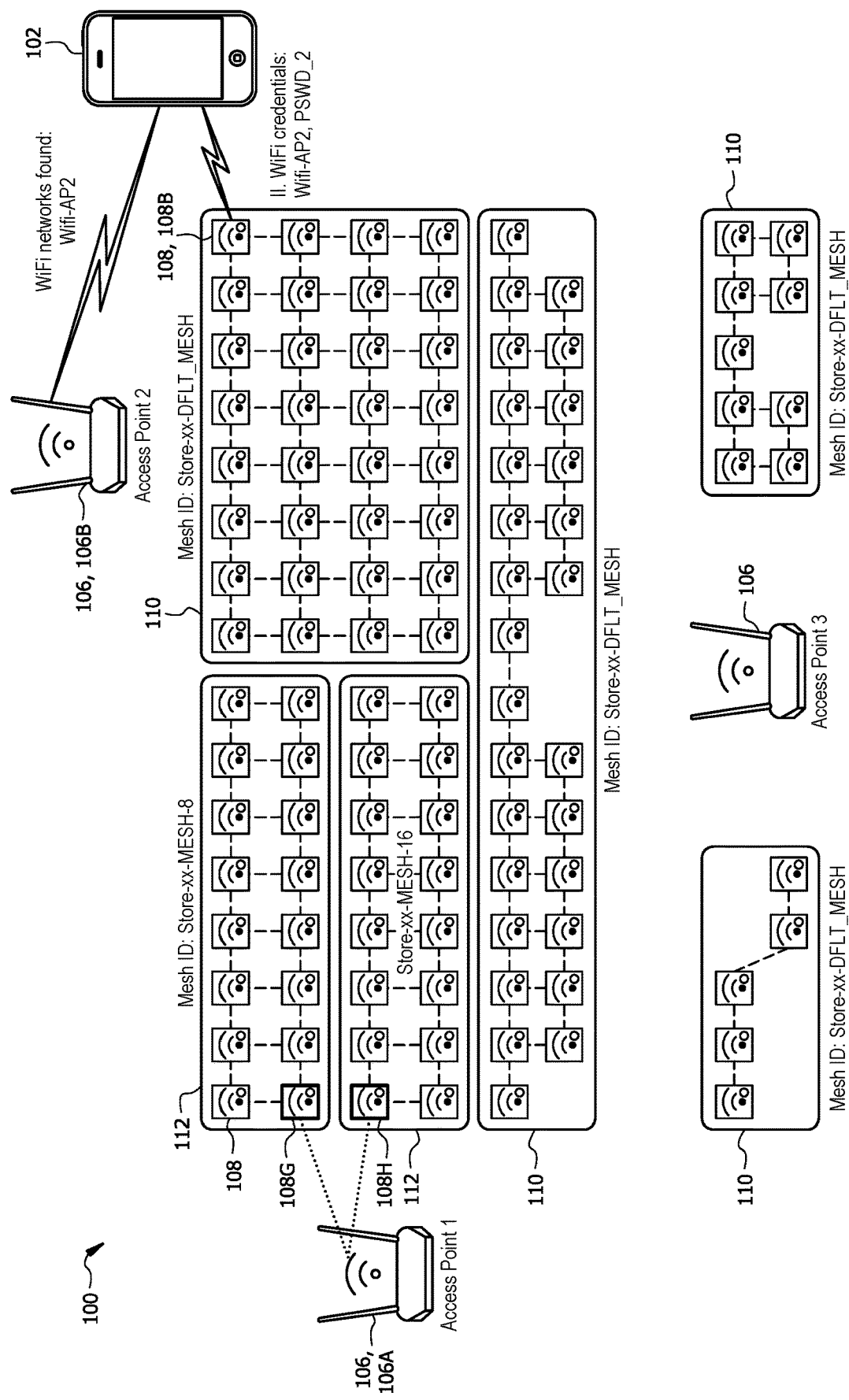

The provisioning engine 1808 returns to step 204 in response to determining that there are unprovisioned controllers 108 still remaining. In this case, the provisioning engine 1808 returns to step 204 to repeat the process of connecting with another controller 108 to configure one or more controllers 108 to join a provisioned mesh network 112. Continuing with the previous example, in FIG. 5, the network provisioning device 102 moves to another location at the worksite and establishes a peer-to-peer connection with another controller 108B that is a member of an unprovisioned mesh network 110. For example, the technician may approach and establish a peer-to-peer connection with one of the controllers 108B that has a yellow blinking indicator which indicates that the controller 108B is a member of an unprovisioned mesh network 110. After establishing the peer-to-peer connection, the controller 108B acts as a temporary gateway for communicating with other controllers 108 within the unprovisioned mesh network 110. In this example, the provisioning engine 1808 identifies a wireless network (shown as WiFi-AP2) that is associated with a second access point 106B that is in range of the controllers 108 in the unprovisioned mesh network 110. The provisioning engine 1808 may identify the wireless network using a process that is similar to the process described in step 206. The provisioning engine 1808 obtains network credentials 1814 for the identified wireless network and sends the network credentials 1814 to the controller 108B. The controller 108B uses the network credentials 1814 to join a provisioned mesh network 112 using the identified wireless network. The controller 108B also sends the network credentials 1814 to other controllers 108 within the unprovisioned mesh network 110 before leaving the unprovisioned mesh network 110. This allows the other controllers 108 to join the provisioned mesh network 112 or to form their own provisioned mesh networks 112.

Figure 6:
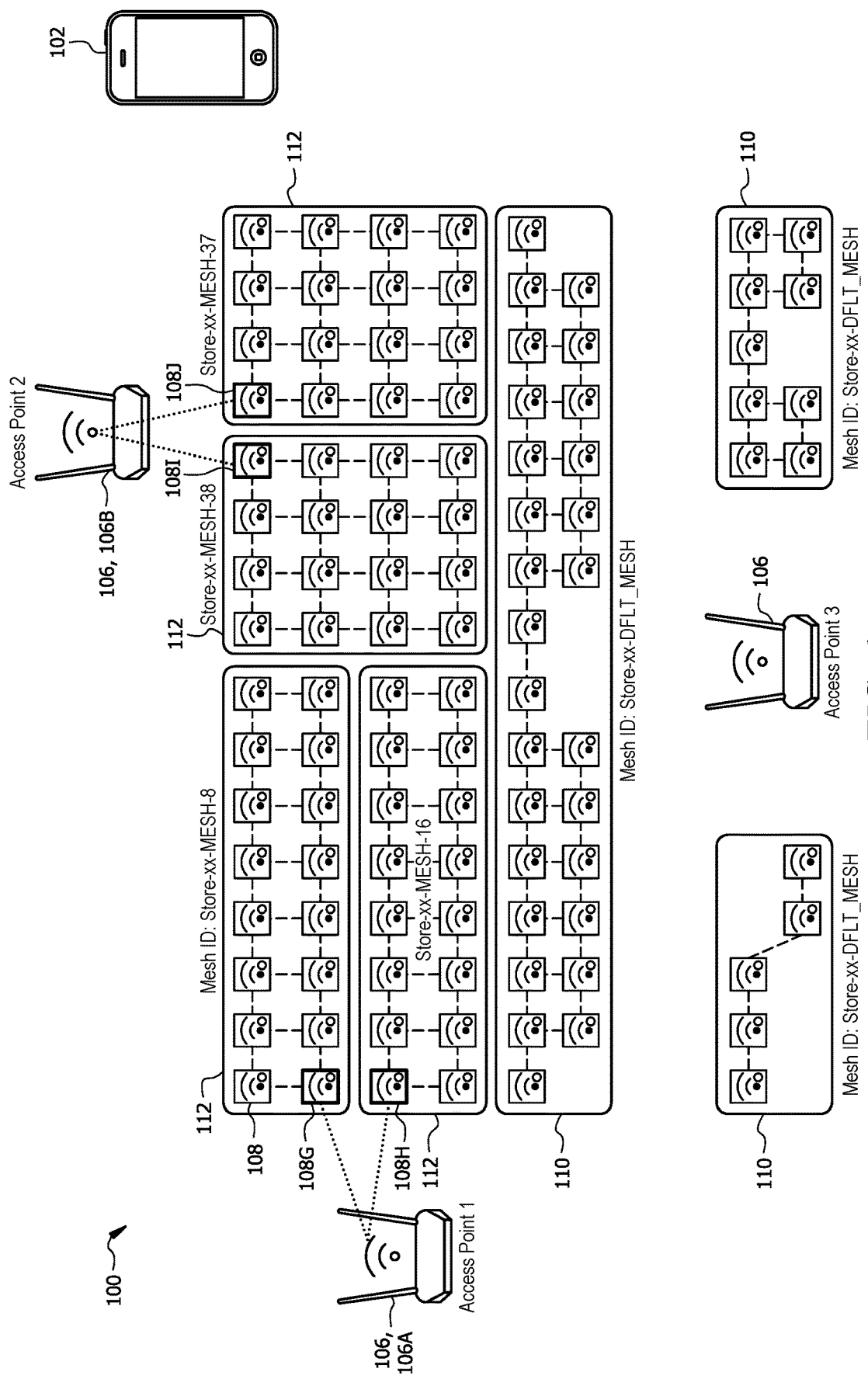

Referring to FIG. 6, the controllers 108 within the unprovisioned mesh network 110 are split up to form two provisioned mesh networks 112. In this example, controllers 108I and 108J become gateway controllers 108 because they are directly connected to the second access point 106B. The controllers 108 within the two new provisioned mesh networks 112 are able to communicate with other controllers 108 or network devices in the local area network via the second access point 106B. After the two new provisioned mesh networks 112 are formed, the provisioning engine 1808 updates the number of unprovisioned controllers 108. In this example, there are forty-two unprovisioned controllers 108 remaining.

Figure 7:
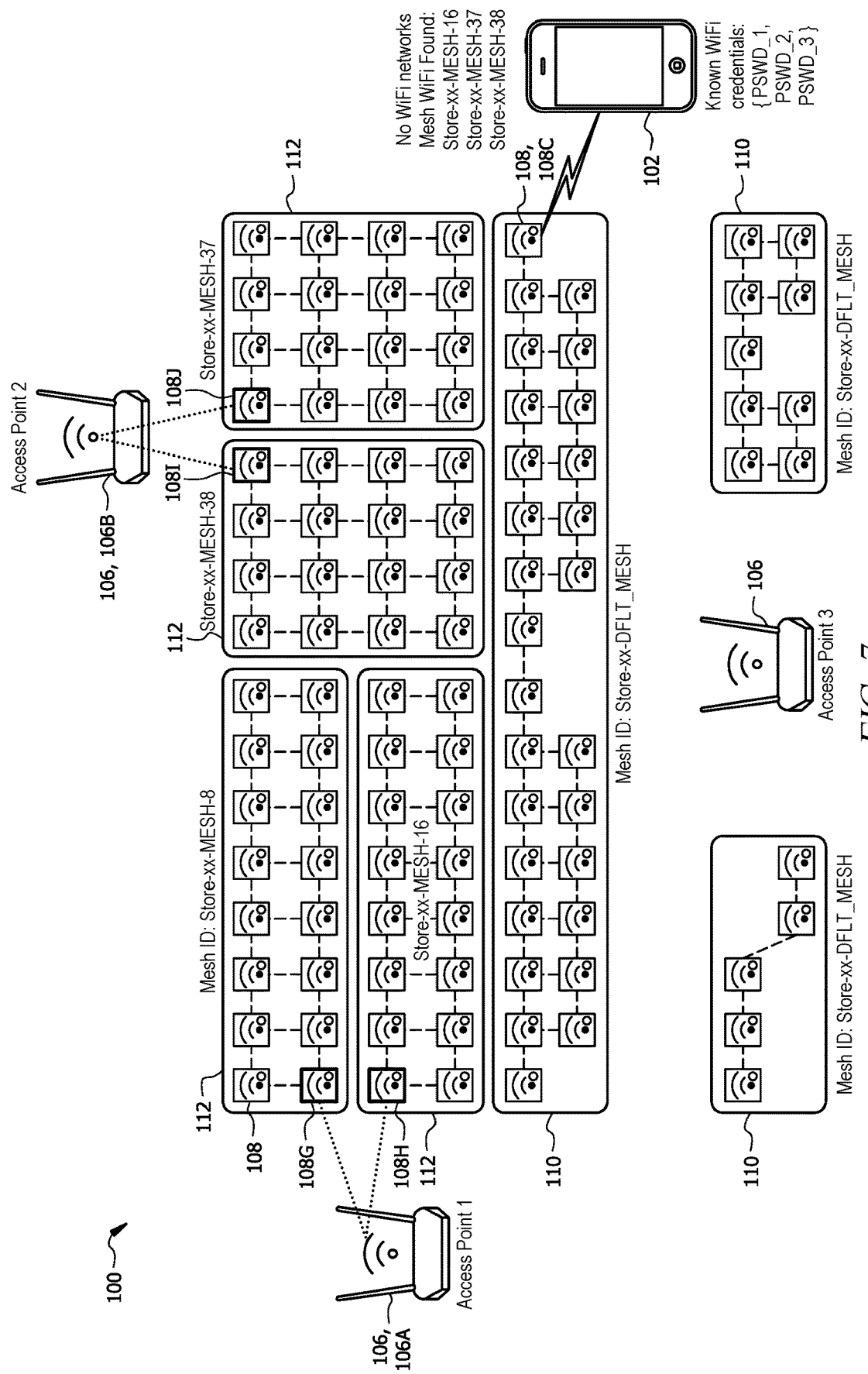

In FIG. 7, the network provisioning device 102 moves to a different location at the worksite to connect to another controller 108C. The provisioning engine 1808 establishes a peer-to-peer connection with a controller 108C that is a member of an unprovisioned mesh network 110. For example, the technician may approach and establish a peer-to-peer connection with one of the controllers 108C that has a yellow blinking indicator which indicates that the controller 108C is a member of an unprovisioned mesh network 110. After establishing the peer-to-peer connection, the controller 108C acts as a temporary gateway for communicating with other controllers 108 within the unprovisioned mesh network 110. In this example, the provisioning engine 1808 determines that there are no known wireless networks that are in range of the controller 108C. In this case, the provisioning engine 1808 determines that one or more of the previously established provisioned mesh networks 112 are in range of the controllers 108 in the unprovisioned mesh network 110. The provisioning engine 1808 may identify the provisioned mesh networks using a process that is similar to the process described in step 212.

The provisioning engine 1808 obtains the network credentials 1814 for the one or more existing provisioned mesh networks 112 and sends the network credentials 1814 to the controller 108C. The controller 108C uses the network credentials 1814 to join one of the existing provisioned mesh networks 112. The controller 108C also sends the network credentials 1814 to other controllers 108 within the unprovisioned mesh network 110 before leaving the unprovisioned mesh network 110. This allows the other controllers 108 to also join the provisioned mesh network 112.

Figure 8:
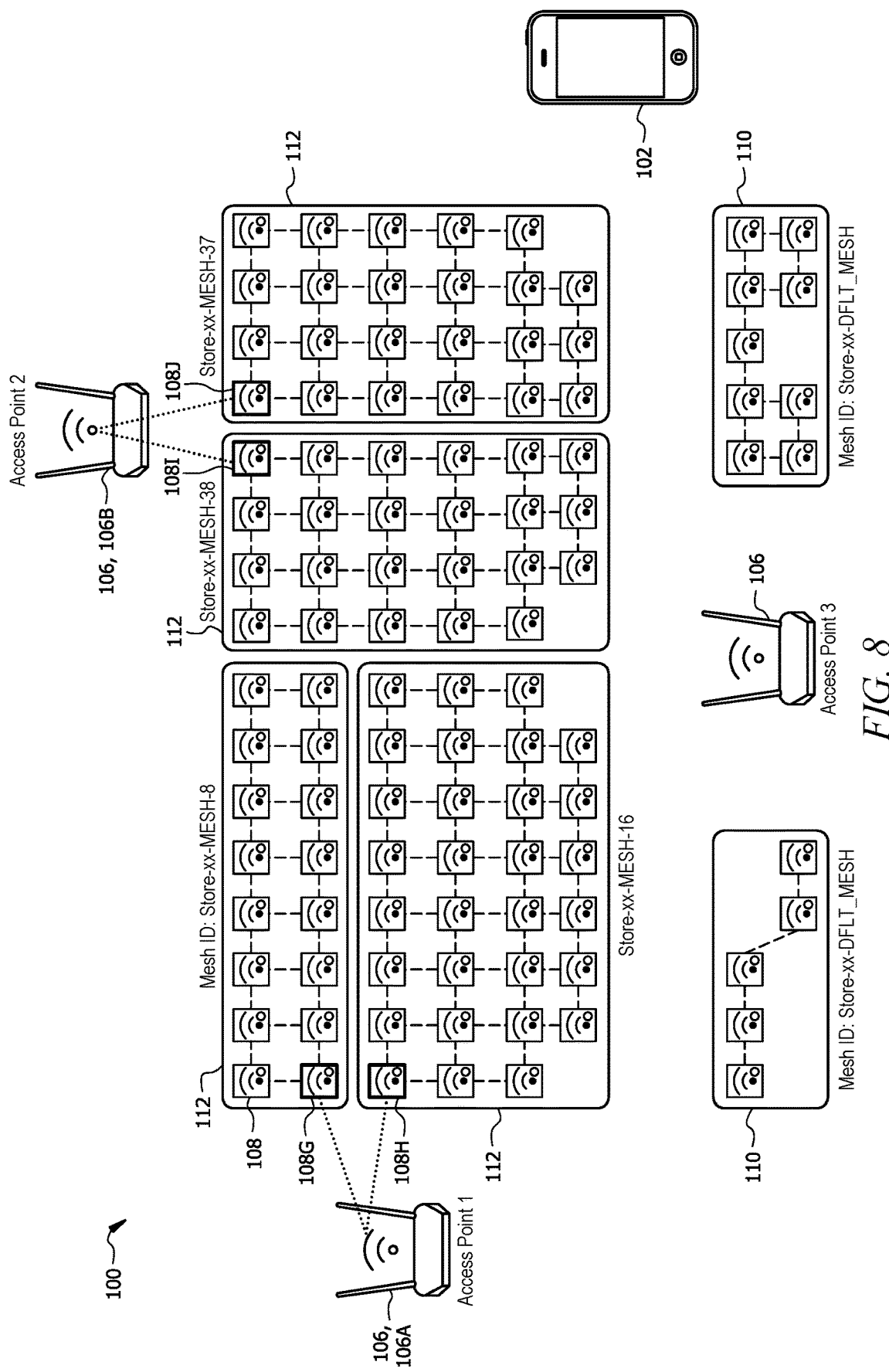

Referring to FIG. 8, the controllers 108 within the unprovisioned mesh network 110 join one of the existing provisioned mesh networks 112. For example, the controllers 108 may join the provisioned mesh network 112 that offers the strongest signal strength. After the controllers 108 join one of the provisioned mesh networks 112, the provisioning engine 1808 updates the number of unprovisioned controllers 108. In this example, there are fourteen unprovisioned controllers 108 remaining.

Figure 9:
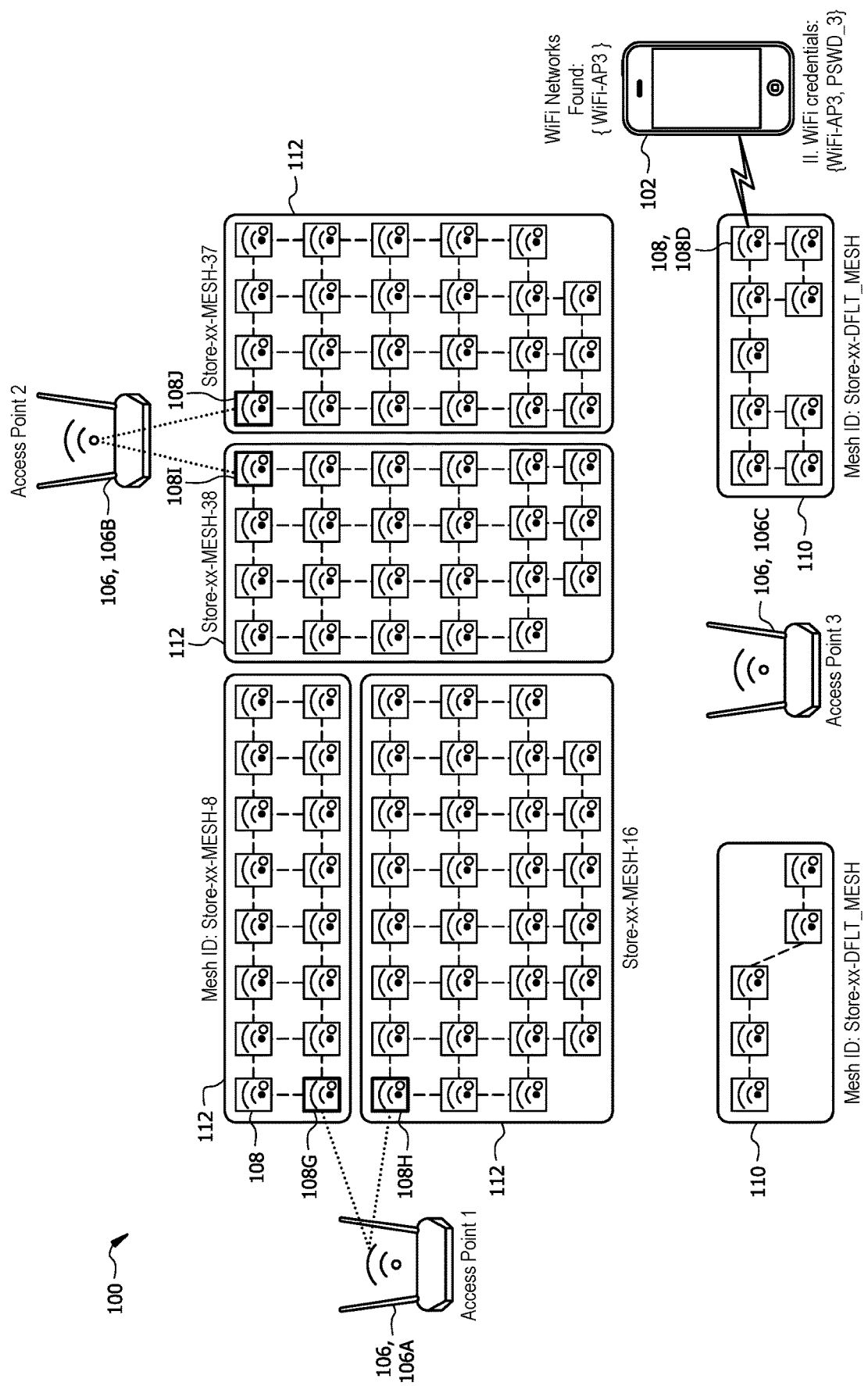

In FIG. 9, the network provisioning device 102 moves to a different location at the worksite to connect to another controller 108D. The provisioning engine 1808 establishes a peer-to-peer connection with a controller 108D that is a member of an unprovisioned mesh network 110. For example, the technician may approach and establish a peer-to-peer connection with one of the controllers 108D that has a yellow blinking indicator which indicates that the controller 108D is a member of an unprovisioned mesh network 110. After establishing the peer-to-peer connection, the controller 108D acts as a temporary gateway for communicating with other controllers 108 within the unprovisioned mesh network 110. In this example, the provisioning engine 1808 identifies a wireless network (shown as WiFi-AP3) that is associated with a third access point 106C that is in the range of the controllers 108 in the unprovisioned mesh network 110. The provisioning engine 1808 may identify the wireless network using a process that is similar to the process described in step 206. The provisioning engine 1808 obtains network credentials 1814 for the identified wireless network and sends the network credentials 1814 to the controller 108D. The controller 108D uses the network credentials 1814 to join a provisioned mesh network 112 using the identified wireless network. The controller 108D also sends the network credentials 1814 to other controllers 108 within the unprovisioned mesh network 110 before leaving the unprovisioned mesh network 110. This allows the other controllers 108 to also join the provisioned mesh network 112.

Figure 10:
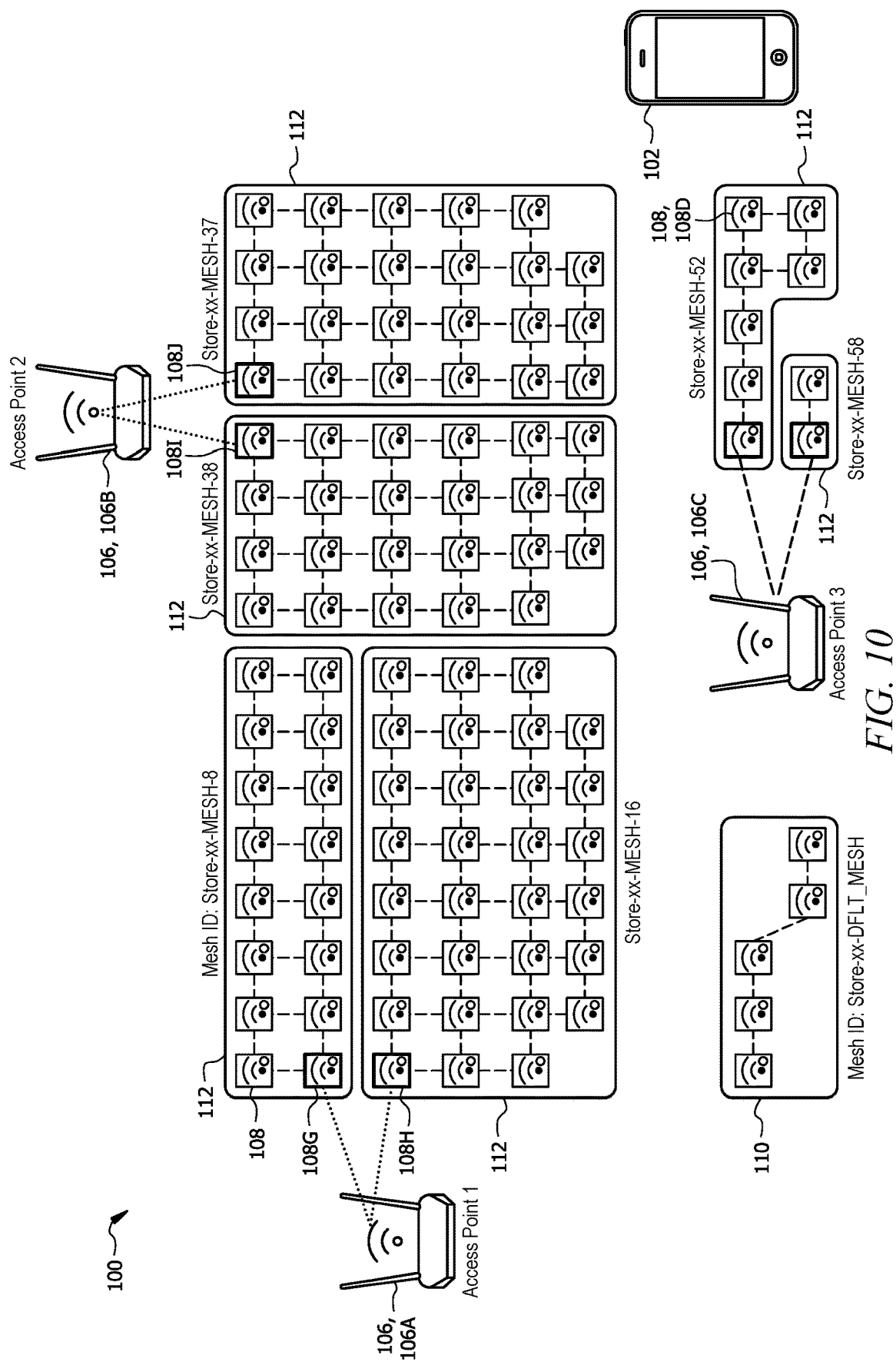

Referring to FIG. 10, the controllers 108 within the unprovisioned mesh network 110 form two provisioned mesh networks 112. The controllers 108 within the two new provisioned mesh networks 112 are able to communicate with other controllers 108 or network devices in the local area network via the third access point 106C. After forming the two new provisioned mesh networks 112, the provisioning engine 1808 updates the number of unprovisioned controllers 108. In this example, there are five unprovisioned controllers 108 remaining.

Figure 11:
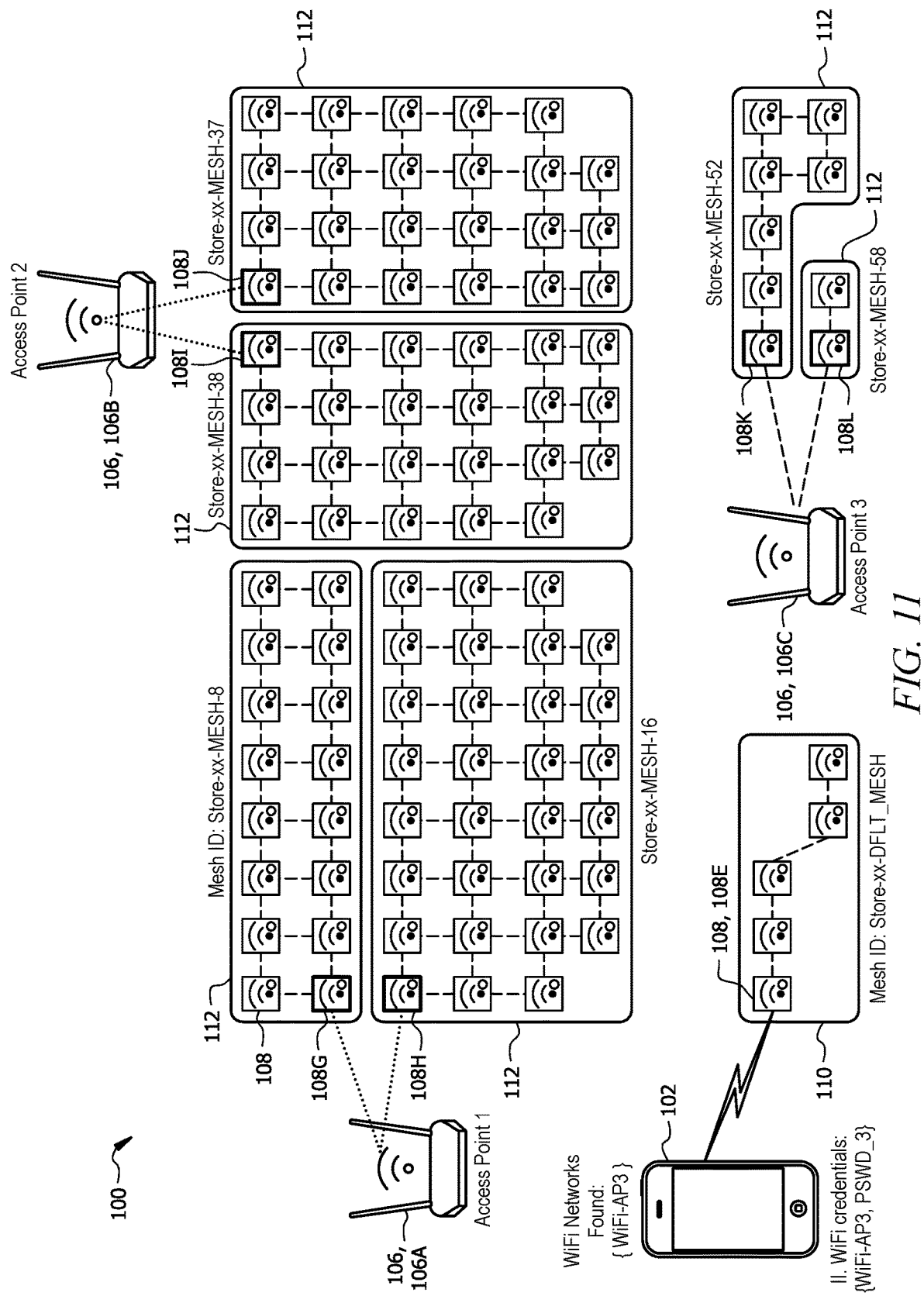

In FIG. 11, the network provisioning device 102 moves to a different location at the worksite to connect to another controller 108E. The provisioning engine 1808 establishes a peer-to-peer connection with a controller 108E that is a member of an unprovisioned mesh network 110. For example, the technician may approach and establish a peer-to-peer connection with one of the controllers 108E that has a yellow blinking indicator which indicates that the controller 108E is a member of an unprovisioned mesh network 110. After establishing the peer-to-peer connection, the controller 108E acts as a temporary gateway for communicating with other controllers 108 within the unprovisioned mesh network 110. In this example, the provisioning engine 1808 identifies the wireless network (shown as WiFi-AP3) that is associated with the third access point 106C that is in range of the controllers 108 in the unprovisioned mesh network 110. The provisioning engine 1808 may identify the wireless network using a process that is similar to the process described in step 206. The provisioning engine 1808 obtains network credentials 1814 for the identified wireless network and sends the network credentials 1814 to the controller 108E. The controller 108E uses the network credentials 1814 to join a provisioned mesh network 112. The controller 108E also sends the network credentials 1814 to other controllers 108 within the unprovisioned mesh network 110 before leaving the unprovisioned mesh network 110. This allows the other controllers 108 to join the provisioned mesh network 112 or to form their own provisioned mesh network 112.

Figure 12:
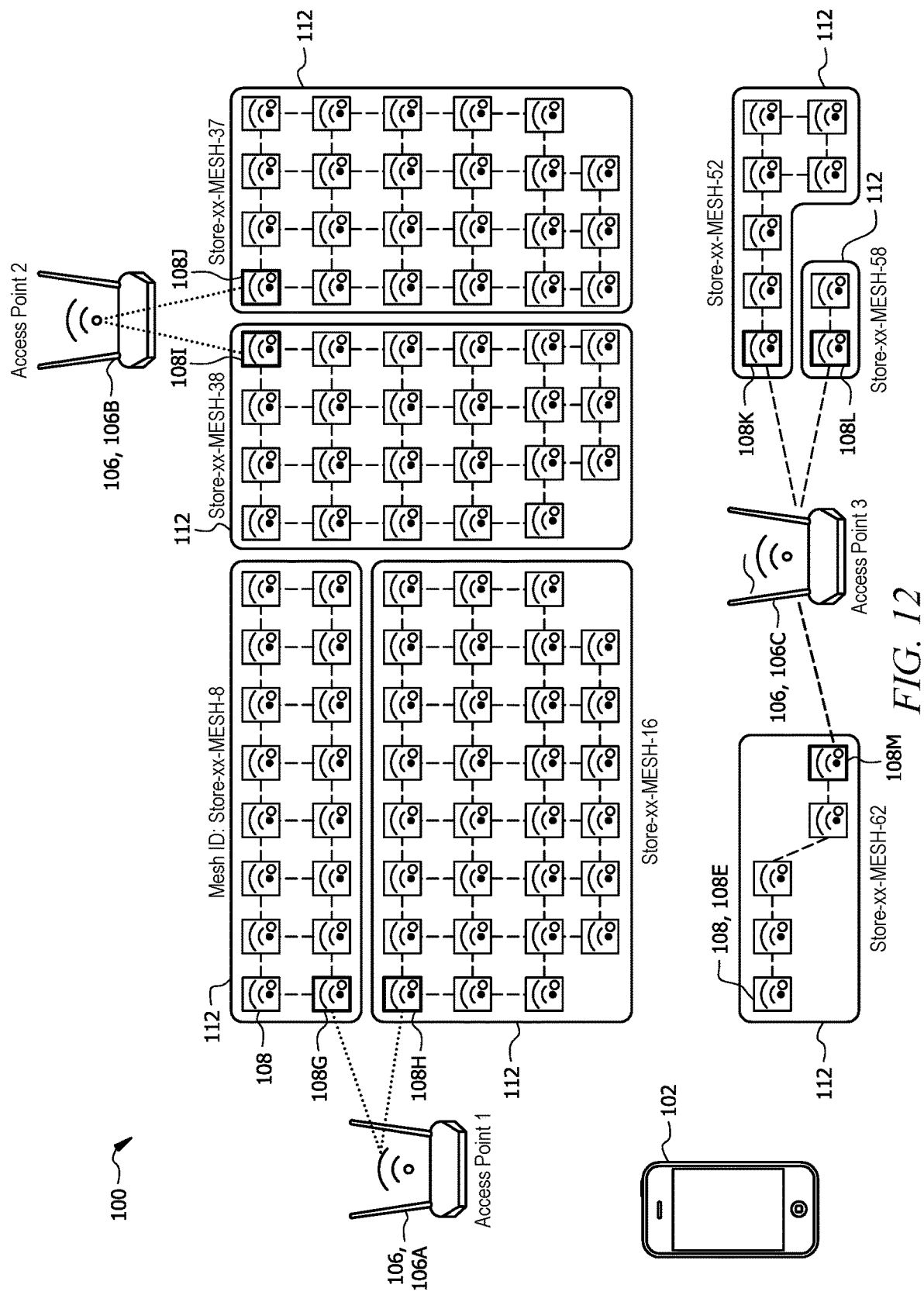

Referring to FIG. 12, the controllers 108 within the unprovisioned mesh network 110 form a new provisioned mesh network 112. In this example, controllers 108K, 108L, and 108M become gateway controllers 108 because they are directly connected to the third access point 106C. The controllers 108 within the new provisioned mesh network 112 are able to communicate with other controllers 108 or network devices in the local area network via the third access point 106C. After the new provisioned mesh network 112 is formed, the provisioning engine 1808 updates the number of unprovisioned controllers 108. In this example, there are no more unprovisioned controllers 108 remaining.

Returning to FIG. 2 at step 220, the provisioning engine 1808 terminates method 200 in response to determining that there are no unprovisioned controllers 108 remaining. In this case, the provisioning engine 1808 has finished adding all of the controllers 108 to provisioned mesh networks 112 that are associated with the local area network. This means that all of the controllers 108 can now communicate with each other via the local area network to control the HVAC system 104.

Network Device Integration Process

Figure 13:
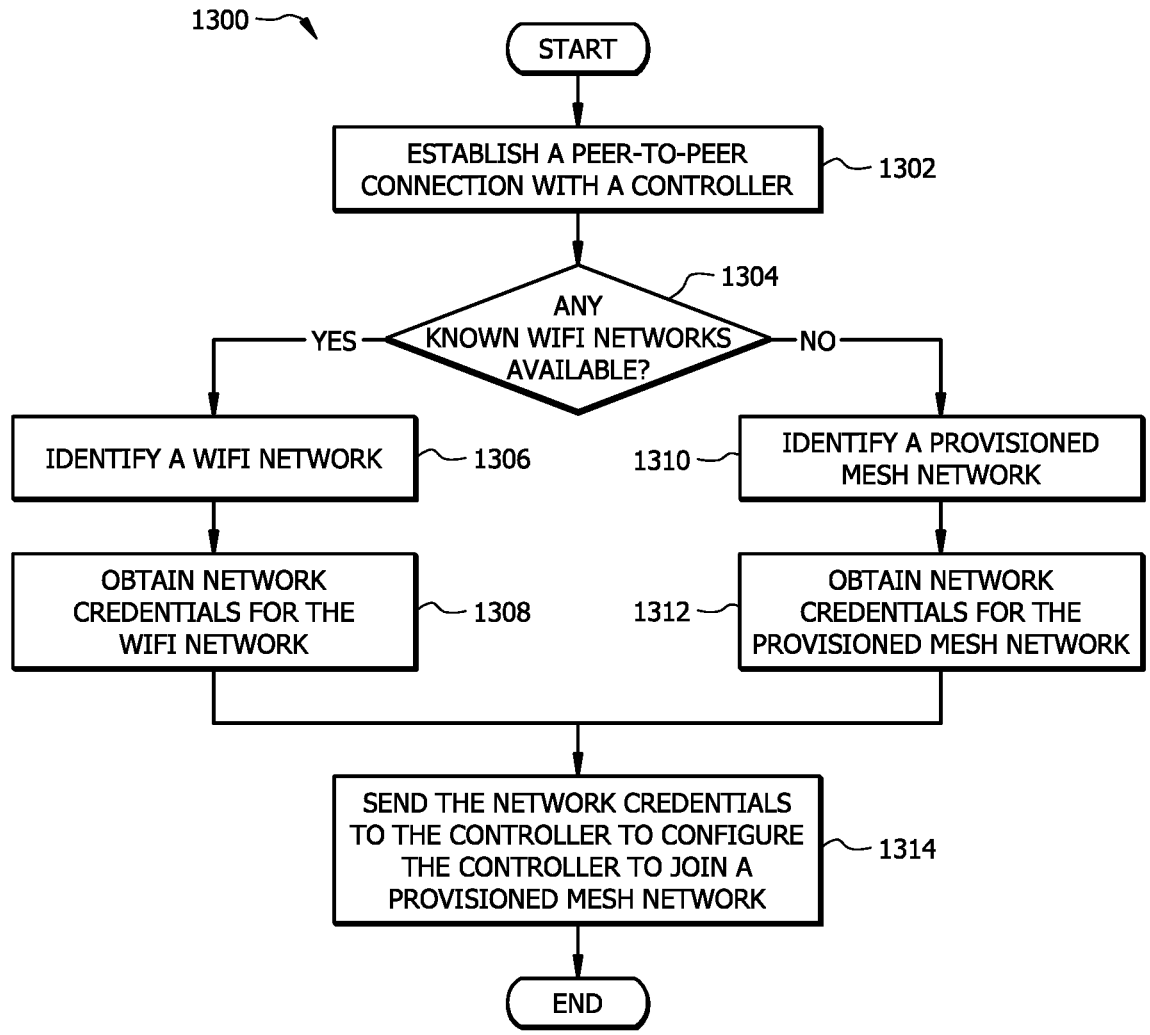
FIG. 13 is a flowchart of an embodiment of a network device integration method for joining a provisioned mesh network.

FIG. 13 is a flowchart of an embodiment of a network device integration method 1300 for joining a provisioned mesh network 112. In one embodiment, the network provisioning device 102 may employ method 1300 to configure a controller 108 that is to be added to an existing worksite. As an example, a worksite may be previously configured with a plurality of controllers 108 that form one or more provisioned mesh networks 112 that are associated with a local area network. In this example, a new controller 108 may be installed at the worksite and needs to be configured to join one of the existing provisioned mesh networks 112. The network provisioning device 102 employs method 200 to communicate with the new controller 108 to add the new controller 108 to one of the existing provisioned mesh networks 112.

At step 1302, the provisioning engine 1808 establishes a peer-to-peer connection with a controller 108. In this case, the controller 108 may be a new controller or a recently serviced controller that has not yet joined any wireless networks or unprovisioned mesh networks 110. Referring to the example in FIG. 14, the provisioning engine 1808 establishes a peer-to-peer connection (e.g. a Bluetooth connection) with the controllers 108F. After the peer-to-peer connection is established, the controller 108F will act as a temporary gateway for communicating with other controllers 108 within the unprovisioned mesh network 110.

At step 1304, the provisioning engine 1808 determines whether there are any known wireless networks available. Here, the provisioning engine 1808 determines whether there are any known or trusted wireless networks that are in range of the controller 108F. For example, the provisioning engine 1808 may send a request to the controller 108F to query the controller 108F to identify the wireless networks that are in range of the controllers 108F. The controller 108F will aggregate the list of available wireless networks and provide the list of wireless networks to the provisioning engine 1808The provisioning engine 1808 may then determine whether any of the available wireless networks match a known wireless network that is associated with a local area network for the worksite. For instance, the provisioning engine 1808 may compare identifiers for the available wireless networks to a set of network identifiers 1812 for known or trusted wireless networks. The provisioning engine 1808 determines that there is a known wireless network in the range of the controller 108F when one of the known network identifiers 1812 matches one of the available wireless network identifiers. Otherwise, the provisioning engine 1808 determines that there are not any known or trusted wireless networks in range of the controller 108F when a match is not found.

The provisioning engine 1808 proceeds to step 1306 in response to determining that a known wireless network is available. At step 1306, the provisioning engine 1808 identifies a wireless network from the set of known wireless networks that are in range of the controller 108. Returning to the example in FIG. 14, the provisioning engine 1808 may determine that a wireless network (shown as WiFi-AP3) associated with the third access point 106C is in range of the controller 108F. In this example, the provisioning engine 1808 will identify and select the wireless network that is associated with the third access point 106C. In other examples, the provisioning engine 1808 may identify or select a known wireless network based on signal strength when more than one known wireless networks are in the range of the controller 108. For example, the provisioning engine 1808 may identify the wireless network with the greatest signal strength. This process ensures that the controller 108 connects with the access point 106 that can provide the best network connection with the controller 108.

Returning to FIG. 13 at step 1308, the provisioning engine 1808 obtains network credentials 1814 for the identified wireless network. In one embodiment, the provisioning engine 1808 may prompt the technician to provide network credentials 1814 (e.g. log-in credentials) to join the identified wireless network. For example, the provisioning engine 1808 may prompt the technician for network credentials 1814 using a graphical user interface. The provisioning engine 1808 receives a user input from the technician that includes the network credentials 1814 for joining the identified wireless network. In another embodiment, the provisioning engine 1808 may obtain the network credentials 1814 from memory (e.g. memory 1804). For example, provisioning engine 1808 may have previously stored network credentials 1814 for wireless networks that are associated with the worksite. In this case, the provisioning engine 1808 may use the network identifier 1812 for the identified wireless network to look-up network credentials 1814 for joining the identified wireless network.

Returning to step 1304, the provisioning engine 1808 proceeds to step 1310 in response to determining that a known wireless network is not available. When the provisioning engine 1808 is unable to find a known wireless network that is range of the controller 108, the provisioning engine 1808 may determine whether there are any nearby existing provisioned mesh networks 112 that are in range of the controller 108. At step 1310, the provisioning engine 1808 identifies an existing provisioned mesh network 112. For example, the provisioning engine 1808 may send a request to the controller 108F to query the controller 108F to identify any existing provisioned mesh networks 112 that are in range of the controller 108F. The controller 108F will aggregate the list of available provisioned mesh networks 112 and provide the list of the provisioned mesh networks 112 to the provisioning engine 1808. The provisioning engine 1808 may then determine whether any of the available provisioned mesh networks 112 matches a known provisioned mesh network 112 that is associated with the local area network for the worksite. For instance, the provisioning engine 1808 may compare identifiers for the available provisioned mesh networks 112 to a set of network identifiers 1812 for known or trusted provisioned mesh networks 112. The provisioning engine 1808 may display a list of the available provisioned mesh networks 112 or report that qualified provisioned mesh networks 112 are in available in range to the technician using a graphical user interface. The provisioning engine 1808 may identify the provisioned mesh networks using a process that is similar to the process described in step 212.

At step 1312, the provisioning engine 1808 obtains network credentials 1814 for the provisioned mesh network 112. The provisioning engine 1808 may obtain network credentials 1814 for the provisioned mesh networks using a process that is similar to the process described in step 214. In one embodiment, the provisioning engine 1808 may prompt the technician to provide network credentials 1814 (e.g. log-in credentials) to join the identified provisioned mesh network 112. For example, the provisioning engine 1808 may prompt the technician for network credentials 1814 using a graphical user interface. The provisioning engine 1808 receives a user input from the technician that includes the network credentials 1814 for joining the identified provisioned mesh network 112. In another embodiment, the provisioning engine 1808 may obtain the network credentials 1814 from memory (e.g. memory 1804). For example, provisioning engine 1808 may have previously stored network credentials 1814 for provisioned mesh networks 112 that are associated with the worksite. In this case, the provisioning engine 1808 may use the network identifier 1812 for the identified provisioned mesh network 112 to look-up network credentials 1814 for joining the identified provisioned mesh network 112. At step 1314, the provisioning engine 1808 sends the network credentials 1814 to the controller 108 to join a provisioned mesh network 112. Here, the provisioning engine 1808 sends the controller 108F the network credentials 1814 which allows the controller 108F to pass authentication to join a provisioned mesh network 112. In other words, the controller 108F may use the received network credentials 1814 to authenticate itself to join the identified wireless network or the identified existing provisioned mesh network 112. The controller 108F becomes a member of a provisioned mesh network 112 after joining the identified wireless network or joining the identified existing provisioned mesh network 112.

Figure 14:
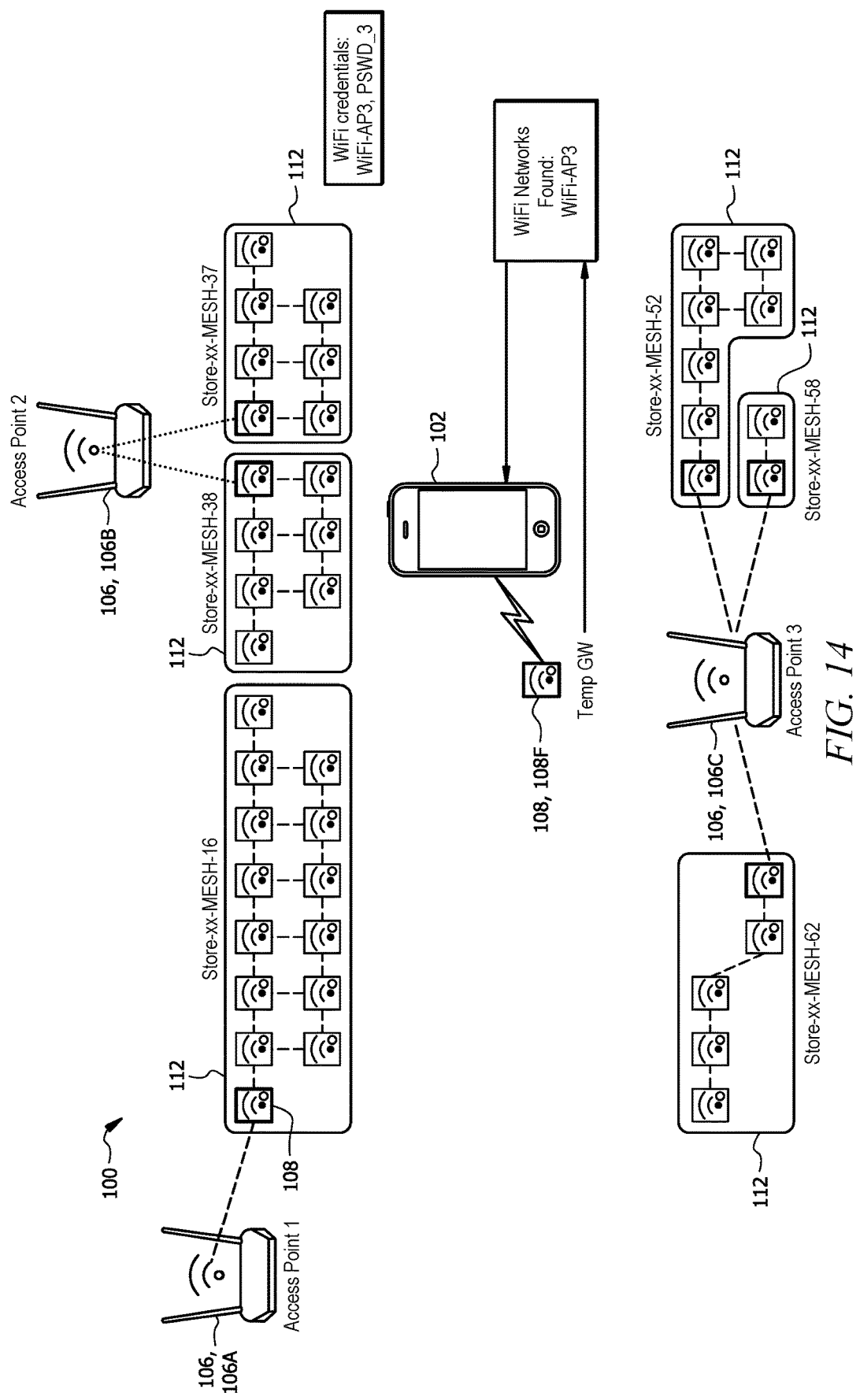
FIGS. 14 and 15 are an example of the network device integration process to a wireless network.
Figure 15:
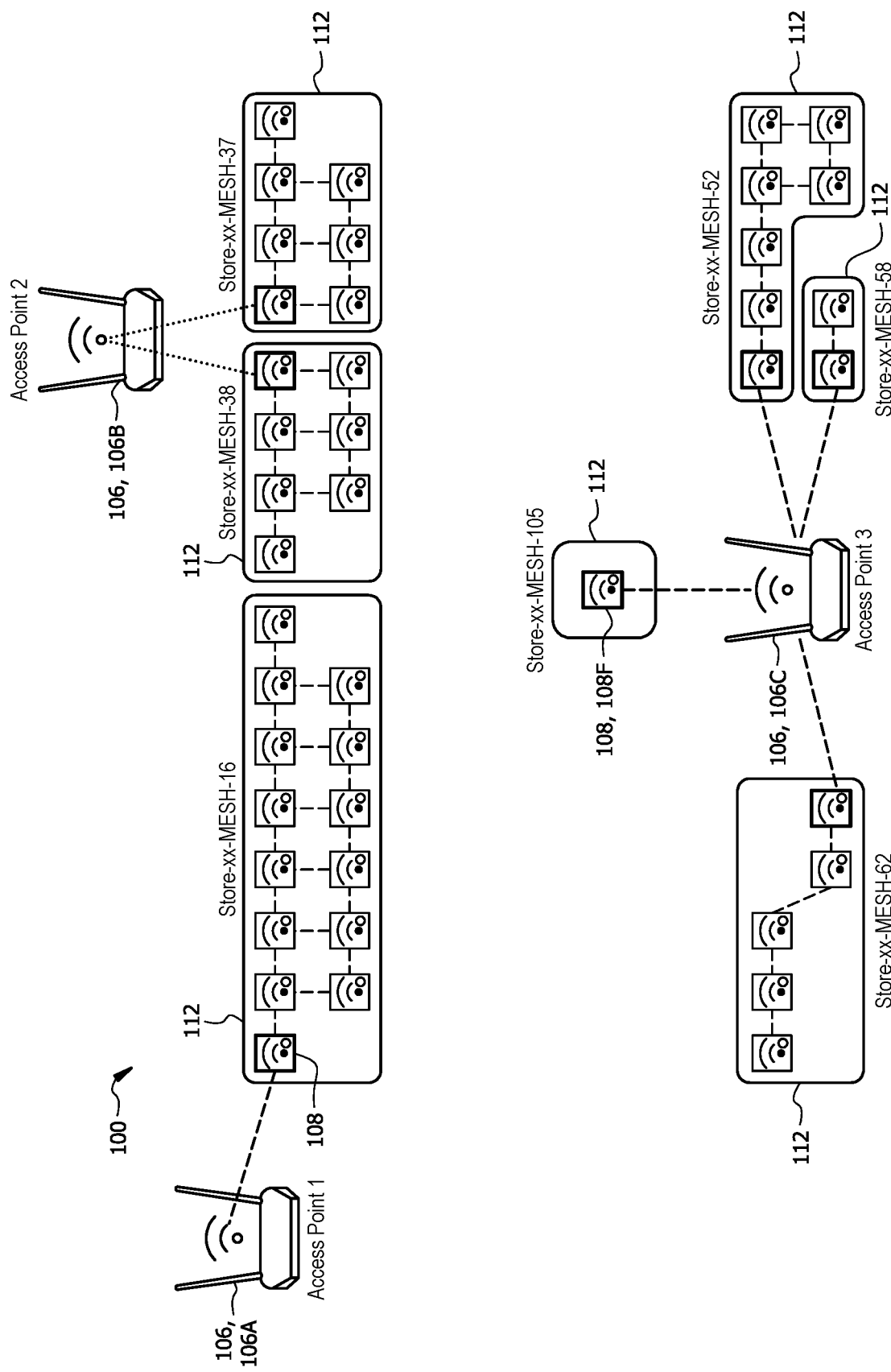

Returning to the example in FIG. 14, the provisioning engine 1808 send network credentials 1814 to the controller 108F. In response to receiving the network credentials 1814, the controller 108F provides the network credentials 1814 to the third access point 106C to join the wireless network and to start forming a provisioned mesh network 112. Referring to FIG. 15, after providing the network credentials 1814 to the third access point 106C, the controller 108F forms a provisioned mesh network 112 that only includes itself.

Figure 16:
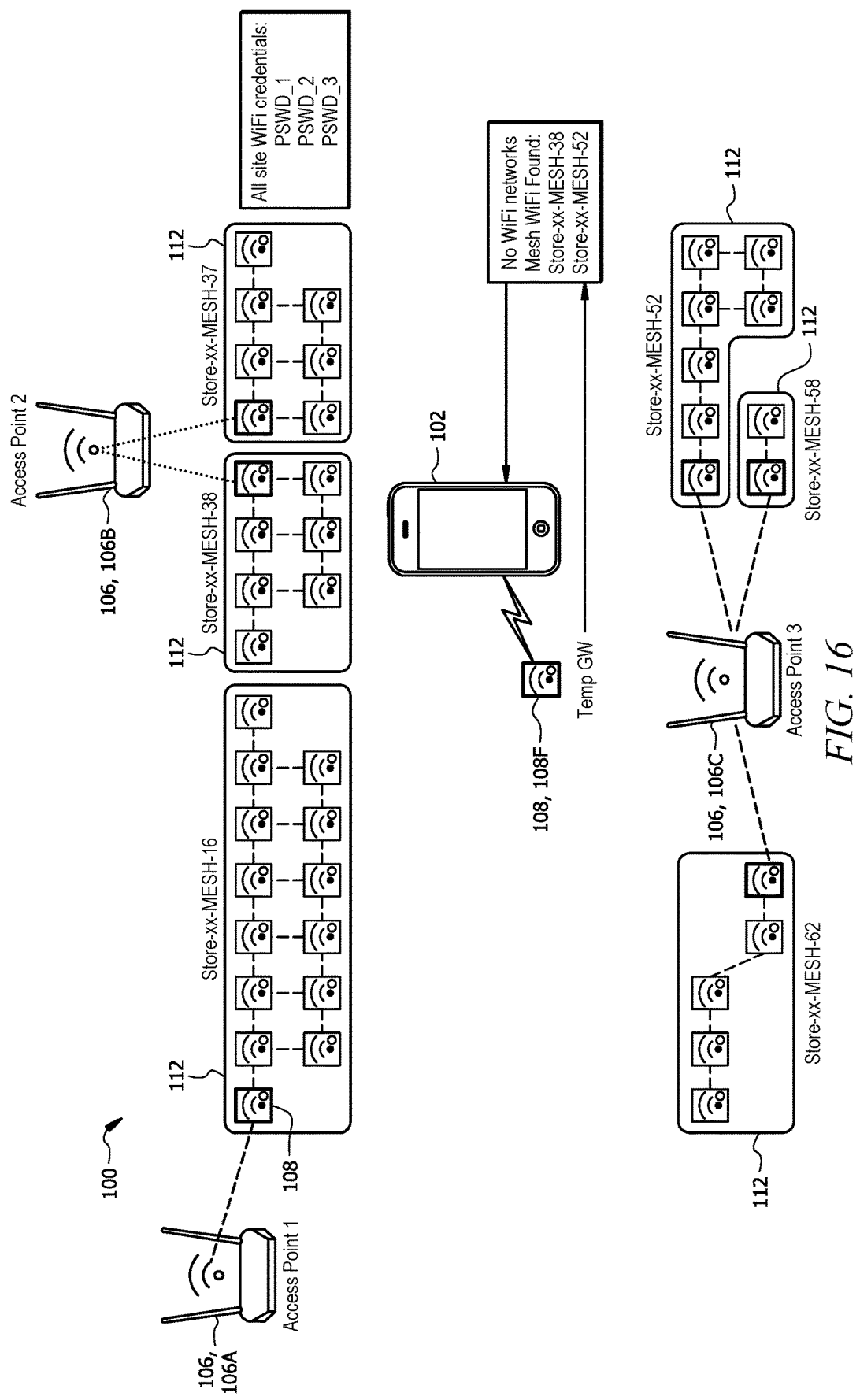
FIGS. 16 and 17 are an example of the network device integration process to an existing provisioned mesh network.
Figure 17:
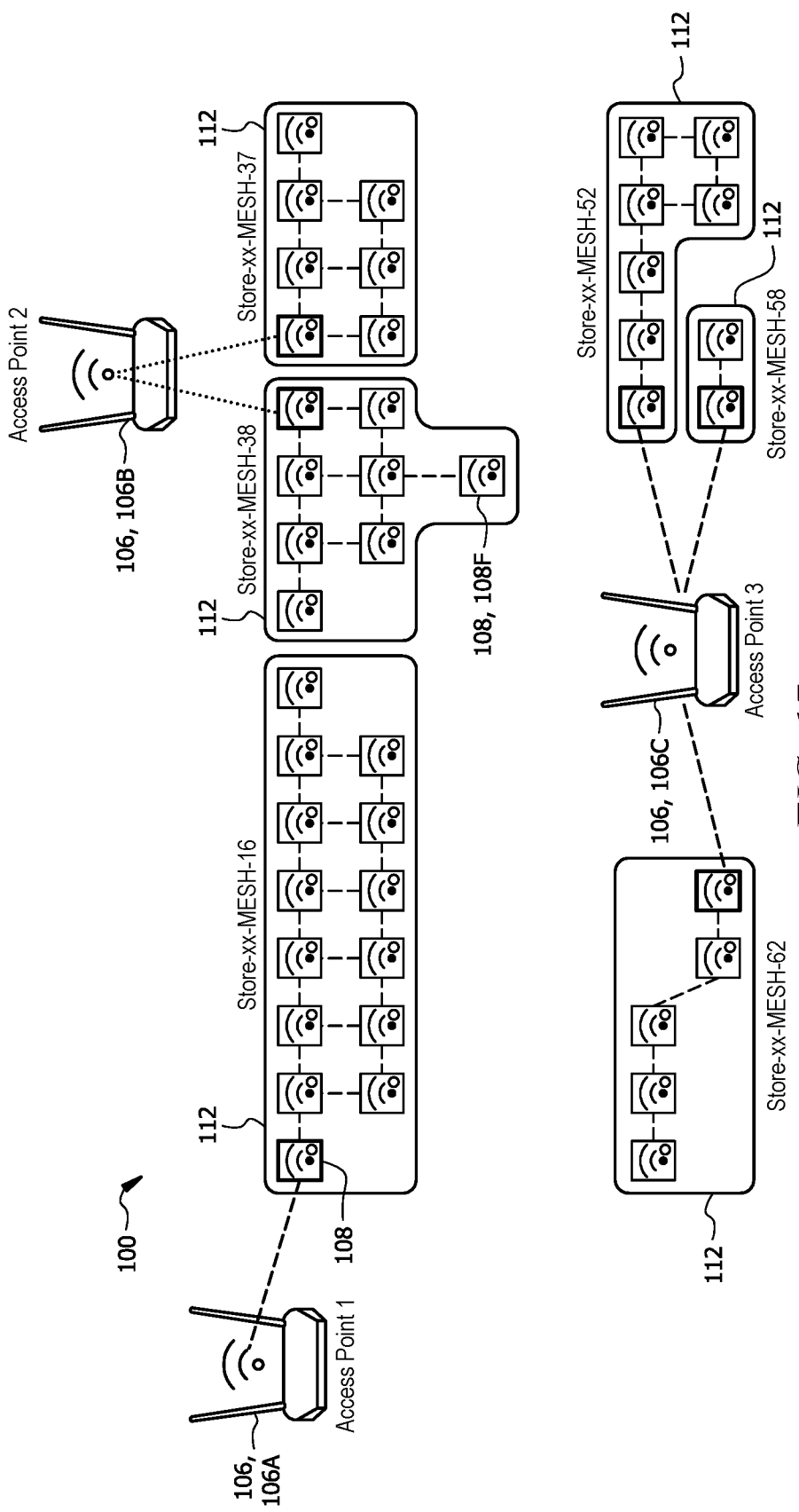

In other examples, the controller 108F may be added to other existing provisioned mesh networks 112. Referring to the example in FIG. 16, the provisioning engine 1808 determines that there are no known wireless networks that are in range of the controller 108F. In this case, the provisioning engine 1808 determines that one or more of the previously established provisioned mesh networks 112 are in range of the controller 108F. The provisioning engine 1808 obtains the network credentials 1814 for the one or more existing provisioned mesh networks 112 and sends the network credentials 1814 to the controller 108F. For example, the provisioned mesh networks 112 may be configured to use the same network credentials 1814 as the network credentials 1814 that are used to connect with an access point 106. In this configuration, the provisioning engine 1808 may obtain the network credentials 1814 for the access points 106 from memory 1804 to use with the provisioned mesh networks 112. The controller 108F uses the network credentials 1814 to join one of the existing provisioned mesh networks 112. Referring to FIG. 17, after providing the network credentials 1514 to the third access point 106F, the controller 108F joins one of the existing provisioned mesh networks 112.

Hardware Configuration

Figure 18:
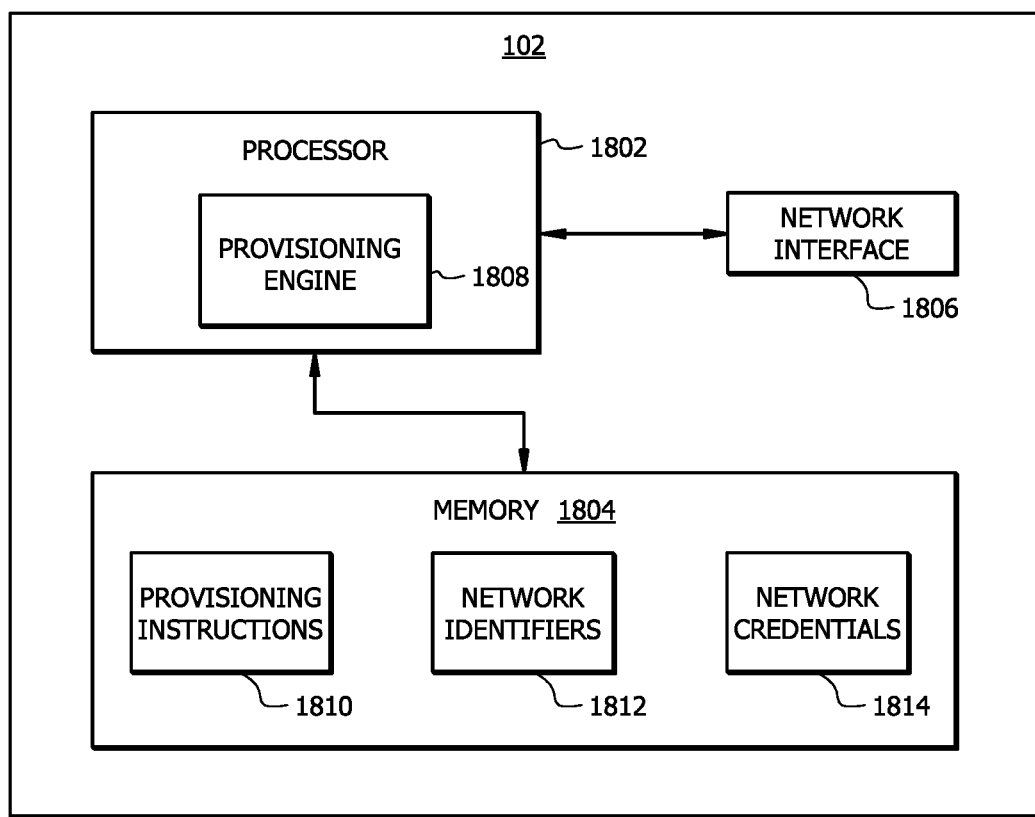
FIG. 18 is a schematic diagram of an embodiment of a device configured to provision a wireless mesh network.

FIG. 18 is a schematic diagram of an embodiment of a device (e.g. network provisioning device 102) configured to provision a wireless mesh network for an HVAC system 104. The network provisioning device 102 comprises a processor 1802, a memory 1804, and a network interface 1806. The network provisioning device 102 may be configured as shown or in any other suitable configuration.

The processor 1802 comprises one or more processors operably coupled to the memory 1804. The processor 1802 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 1802 may be a programmable logic device, a microcontroller, a microprocessor, or any suitable combination of the preceding. The processor 1802 is communicatively coupled to and in signal communication with the memory 1804. The one or more processors are configured to process data and may be implemented in hardware or software. For example, the processor 1802 may be 8-bit, 16-bit, 32-bit, 64-bit, or of any other suitable architecture. The processor 1802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a provisioning engine 1808. In this way, processor 1802 may be a special-purpose computer designed to implement the functions disclosed herein. In an embodiment, the provisioning engine 1808 is implemented using logic units, FPGAs, ASICs, DSPs, or any other suitable hardware. The provisioning engine 1808 is configured to operate as described in FIGS. 1-17. For example, the provisioning engine 1808 may be configured to perform the steps of method 200 and method 1300 as described in FIGS. 2 and 13, respectively.

The memory 1804 comprises one or more disks, tape drives, or solid-state drives, and may be used as an over-flow data storage device, to store programs when such programs are selected for execution, and to store instructions and data that are read during program execution. The memory 1804 may be volatile or non-volatile and may comprise a read-only memory (ROM), random-access memory (RAM), ternary content-addressable memory (TCAM), dynamic random-access memory (DRAM), and static random-access memory (SRAM).

The memory 1804 is operable to store provisioning instructions 1810, network identifiers 1812, network credentials 1814, and/or any other data or instructions. The provisioning instructions 1810 may comprise any suitable set of instructions, logic, rules, or code operable to execute the provisioning engine 1808. The network identifiers 1812 and the network credentials 1814 are configured similar to the network identifiers and network credentials described in FIGS. 1-17, respectively.

The network interface 1806 is configured to enable wired and/or wireless communications. The network interface 1806 is configured to communicate data between the network provisioning device 102 and other devices (e.g. controllers 108 and access points 106), systems, or domains. For example, the network interface 1806 may comprise a near-field communication (NFC) interface, a Bluetooth interface, Zigbee interface, a Z-wave interface, a Radio-Frequency Identification (RFID) interface, a WIFI interface, a LAN interface, a WAN interface, a modem, a switch, or a router. The processor 1802 is configured to send and receive data using the network interface 1806. The network interface 1806 may be configured to use any suitable type of communication protocol as would be appreciated by one of ordinary skill in the art.

HVAC System Configuration

Figure 19:
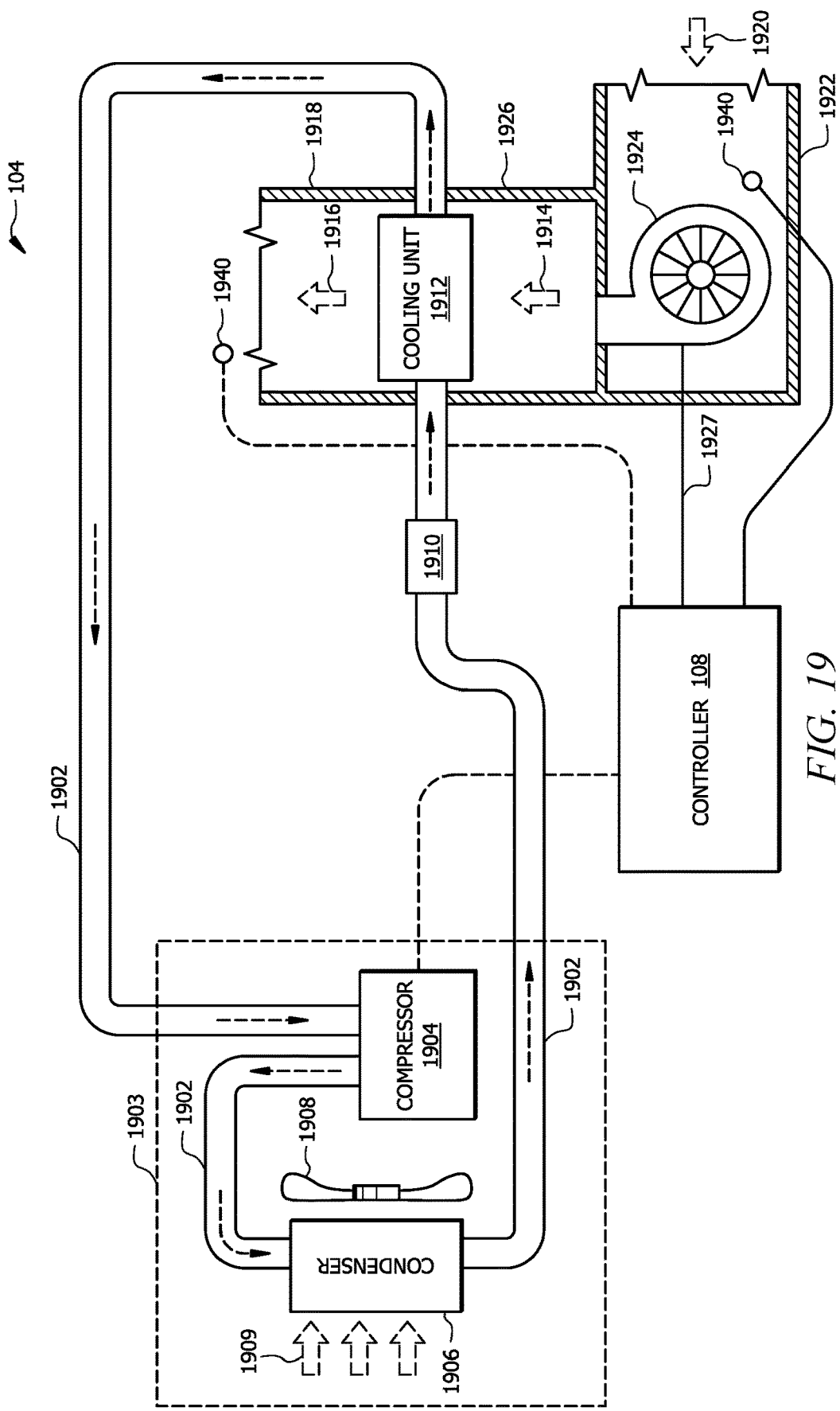
FIG. 19 is a schematic diagram of an embodiment of an HVAC system configured to integrate with a provisioned wireless mesh network.

FIG. 19 is a schematic diagram of an embodiment of an HVAC system 104 configured to integrate with a provisioned wireless mesh network 112. The HVAC system 104 conditions air for delivery to an interior space of a building. In some embodiments, the HVAC system 104 is a rooftop unit (RTU) that is positioned on the roof of a building and the conditioned air is delivered to the interior of the building. In other embodiments, portions of the system may be located within the building and a portion outside the building. The HVAC system 104 may also include heating elements that are not shown here for convenience and clarity. The HVAC system 104 may be configured as shown in FIG. 19 or in any other suitable configuration. For example, the HVAC system 104 may include additional components (e.g. controllers 108) or may omit one or more components shown in FIG. 19.

The HVAC system 104 comprises a working-fluid conduit subsystem 1902 for moving a working fluid, or refrigerant, through a cooling cycle. The working fluid may be any acceptable working fluid, or refrigerant, including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

The HVAC system 104 comprises one or more condensing units 1903. In one embodiment, the condensing unit 1903 comprises a compressor 1904, a condenser coil 1906, and a fan 1908. The compressor 1904 is coupled to the working-fluid conduit subsystem 1902 that compresses the working fluid. The condensing unit 1903 may be configured with a single-stage or multi-stage compressor 1904. A single-stage compressor 1904 is configured to operate at a constant speed to increase the pressure of the working fluid to keep the working fluid moving along the working-fluid conduit subsystem 1902. A multi-stage compressor 1904 comprises multiple compressors configured to operate at a constant speed to increase the pressure of the working fluid to keep the working fluid moving along the working-fluid conduit subsystem 1902. In this configuration, one or more compressors can be turned on or off to adjust the cooling capacity of the HVAC system 104. In some embodiments, a compressor 1904 may be configured to operate at multiple speeds or as a variable speed compressor. For example, the compressor 1904 may be configured to operate at multiple predetermined speeds.

In one embodiment, the condensing unit 1903 (e.g. the compressor 1904) is in signal communication with a controller 108 using a wired or wireless connection. The controller 108 is configured to provide commands or signals to control the operation of the compressor 1904. For example, the controller 108 is configured to send signals to turn on or off one or more compressors 1904 when the condensing unit 1903 comprises a multi-stage compressor 1904. In this configuration, the controller 108 may operate the multi-stage compressors 1904 in a first mode where all the compressors 1904 are on and a second mode where at least one of the compressors 1904 is off. In some examples, the controller 108 may be configured to control the speed of the compressor 1904.

The condenser 1906 is configured to assist with moving the working fluid through the working-fluid conduit subsystem 1902. The condenser 1906 is located downstream of the compressor 1904 for rejecting heat. The fan 1908 is configured to move air 1909 across the condenser 1906. For example, the fan 1908 may be configured to blow outside air through the heat exchanger to help cool the working fluid. The compressed, cooled working fluid flows downstream from the condenser 1906 to an expansion device 1910, or metering device.

The expansion device 1910 is configured to remove pressure from the working fluid. The expansion device 1910 is coupled to the working-fluid conduit subsystem 1902 downstream of the condenser 1906. The expansion device 1910 is closely associated with a cooling unit 1912 (e.g. an evaporator coil). The expansion device 1910 is coupled to the working-fluid conduit subsystem 1902 downstream of the condenser 1906 for removing pressure from the working fluid. In this way, the working fluid is delivered to the cooling unit 1912 and receives heat from airflow 1914 to produce a treated airflow 1916 that is delivered by a duct subsystem 1918 to the desired space, for example, a room in the building.

A portion of the HVAC system 104 is configured to move air across the cooling unit 1912 and out of the duct subsystem 1918. Return air 1920, which may be air returning from the building, fresh air from outside, or some combination, is pulled into a return duct 1922. A suction side of a variable-speed blower 1924 pulls the return air 1920. The variable-speed blower 1924 discharges airflow 1914 into a duct 1926 from where the airflow 1914 crosses the cooling unit 1912 or heating elements (not shown) to produce the treated airflow 1916.

Examples of a variable-speed blower 1924 include, but are not limited to, belt-drive blowers controlled by inverters, direct-drive blowers with electronically commutated motors (ECM), or any other suitable types of blowers. In some configurations, the variable-speed blower 1924 is configured to operate at multiple predetermined fan speeds. In other configurations, the fan speed of the variable-speed blower 1924 can vary dynamically based on a corresponding temperature value instead of relying on using predetermined fan speeds. In other words, the variable-speed blower 1924 may be configured to dynamically adjust its fan speed over a range of fan speeds rather than using a set of predetermined fan speeds. This feature also allows the controller 108 to gradually transition the speed of the variable-speed blower 1924 between different operating speeds. This contrasts with conventional configurations where a variable-speed blower 1924 is abruptly switched between different predetermined fan speeds. The variable-speed blower 1924 is in signal communication with the controller 108 using any suitable type of wired or wireless connection 1927. The controller 108 is configured to provide commands or signals to the variable-speed blower 1924 to control the operation of the variable-speed blower 1924. For example, the controller 108 is configured to send signals to the variable-speed blower 1924 to control the fan speed of the variable-speed blower 1924. In some embodiments, the controller 108 may be configured to send other commands or signals to the variable-speed blower 1924 to control any other functionality of the variable-speed blower 1924.

The HVAC system 104 comprises one or more sensors 1940 in signal communication with the controller 108. The sensors 1940 may comprise any suitable type of sensor for measuring air temperature. The sensors 1940 may be positioned anywhere within a conditioned space (e.g. a room or building) and/or the HVAC system 104. For example, the HVAC system 104 may comprise a sensor 1940 positioned and configured to measure an outdoor air temperature. As another example, the HVAC system 104 may comprise a sensor 1940 positioned and configured to measure a supply or treated air temperature and/or a return air temperature. In other examples, the HVAC system 104 may comprise sensors 1940 positioned and configured to measure any other suitable type of air temperature.

The HVAC system 104 comprises one or more thermostats, for example located within a conditioned space (e.g. a room or building). A thermostat may be a single-stage thermostat, a multi-stage thermostat, or any suitable type of thermostat as would be appreciated by one of ordinary skill in the art. The thermostat is configured to allow a user to input a desired temperature or temperature set point for a designated space or zone such as the room. The controller 108 may use information from the thermostat such as the temperature set point for controlling the compressor 1904 and the variable-speed blower 1924. The thermostat is in signal communication with the controller 108 using any suitable type of wired or wireless communications. In some embodiments, the thermostat may be integrated with the controller 108.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated into another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A Heating, Ventilation, and Air Conditioning (HVAC) network provisioning system, comprising:
   a plurality of controllers, wherein:
      each controller is configured for wireless communications;
      each controller is configured to operate at least a portion of an HVAC system; and
      the plurality of controllers are members of an unprovisioned mesh network, wherein the unprovisioned mesh network is a network that is not associated with a local area network; and
   a network provisioning device, comprising:
      a network interface configured to:
         communicate with one or more wireless networks; and
         communicate with controllers using a peer-to-peer connection; and
      a processor operably coupled to the network interface, configured to:
         establish a peer-to-peer connection with a controller that is a member of the unprovisioned mesh network;
         send a request to the controller to identify a wireless network that is in range of one or more controllers of the plurality of controllers that are members of the unprovisioned mesh network, wherein the wireless network is associated with the local area network;
         obtain network credentials for the identified wireless network; and
         send the network credentials to the controller to join a provisioned mesh network, wherein:
            the provisioned mesh network is associated with a local area network; and
            sending the network credentials to the controller triggers the controller to send the network credentials to other controllers using the unprovisioned mesh network before leaving the unprovisioned mesh network.

2. The system of claim 1, wherein identifying the wireless network comprises identifying an existing provisioned mesh network that is associated with the local area network, and wherein the processor is further configured to:
- determine a number of remaining controllers in the unprovisioned mesh network; and
- send the network credentials to a plurality of the remaining controllers in the unprovisioned mesh network to loin the provisioned mesh network, wherein sending the network credentials to the remaining controllers triggers the remaining controllers to send the network credentials to the other controllers using the unprovisioned mesh network before leaving the unprovisioned mesh network.

3. The system of claim 1, wherein identifying the wireless network comprises:
- identifying a plurality of available wireless networks that are in range of the one or more controllers of the plurality of controllers that are members of the unprovisioned mesh network; and
- selecting a known wireless network that is associated with the local area network from among the plurality of available wireless networks.

4. The system of claim 1, wherein identifying the wireless network comprises:
- determining signal strengths for a plurality of available wireless network that are in range of the one or more controllers of the plurality of controllers that are members of the unprovisioned mesh network; and
- selecting a wireless network with the greatest signal strength from among the plurality of available wireless networks.

5. The system of claim 1, wherein:
- the network provisioning device further comprises a memory operable to store network credentials for a plurality of wireless networks; and
- obtaining the network credentials for the identified wireless network comprises obtaining the network credential from the memory.

6. The system of claim 1, wherein obtaining the network credentials for the identified wireless network comprises:
- prompting a user to provide the network credentials; and
- receiving the network credentials as a user input.

7. The system of claim 1, wherein:
- the network provisioning device further to send a site name to the controller; and
- sending the site name to controller triggers the controller to store an association between the site name and the provisioned mesh network.

8. A wireless network provisioning method, comprising:
- establishing, by the network provisioning device, a peer-to-peer connection with a controller from among a plurality of controllers that are members of an unprovisioned mesh network, wherein:
  - each controller is configured for wireless communications;
  - the unprovisioned mesh network is a network that is not associated with a local area network;
  - each controller is configured to operate at least a portion of a heating, ventilation, and air conditioning (HVAC) system; and
  - the HVAC system is configured to control a temperature within a space;
- sending, by the network provisioning device, a request to the controller to identify a wireless network that is in range of one or more controllers of the plurality of controllers that are members of the unprovisioned mesh network, wherein the wireless network is associated with the local area network;
- obtaining, by the network provisioning device, network credentials for the identified wireless network;
- sending, by the network provisioning device, the network credentials to the controller to join a provisioned mesh network that is associated with a local area network; and
- sending, by the controller, the network credentials to other controllers using the unprovisioned mesh network before leaving the unprovisioned mesh network.

9. The method of claim 8, wherein identifying the wireless network comprises identifying an existing provisioned mesh network that is associated with the local area network, and the method further comprises:
- determining, using the network provisioning device, a number of remaining controllers in the unprovisioned mesh network; and
- sending, using the network provisioning device, the network credentials to a plurality of the remaining controllers in the unprovisioned mesh network to loin the provisioned mesh network, wherein sending the network credentials to the remaining controllers triggers the remaining controllers to send the network credentials to the other controllers using the unprovisioned mesh network before leaving the unprovisioned mesh network.

10. The method of claim 8, wherein identifying the wireless network comprises:
- identifying a plurality of available wireless networks that are in range of the one or more controllers of the plurality of controllers that are members of the unprovisioned mesh network; and
- selecting a known wireless network that is associated with the local area network from among the plurality of available wireless networks.

11. The method of claim 8, wherein identifying the wireless network comprises:
- determining signal strengths for a plurality of available wireless network that are in range of the one or more controllers of the plurality of controllers that are members of the unprovisioned mesh network; and
- selecting a wireless network with the greatest signal strength from among the plurality of available wireless networks.

12. The method of claim 8, wherein obtaining the network credentials for the identified wireless network comprises obtaining the network credential from a memory.

13. The method of claim 8, wherein obtaining the network credentials for the identified wireless network comprises:
- prompting a user to provide the network credentials; and
- receiving the network credentials as a user input.

14. The method of claim 8, further comprising:
- sending, by the network provisioning device, a site name to the controller; and
- storing, by the controller, an association between the site name and the provisioned mesh network.

15. A non-transitory computer readable medium storing instructions that when executed by a processor cause the processor to:
- establish a peer-to-peer connection with a controller from among a plurality of controllers that are members of an unprovisioned mesh network, wherein:
  - each controller is configured for wireless communications;
  - the unprovisioned mesh network is a network that is not associated with a local area network;

each controller is configured to operate at least a portion of a heating, ventilation, and air conditioning (HVAC) system; and the HVAC system is configured to control a temperature within a space;

send a request to the controller to identify a wireless network that is in range of one or more controllers of the plurality of controllers that are members of the unprovisioned mesh network, wherein the wireless network is associated with the local area network;

obtain network credentials for the identified wireless network; and send the network credentials to the controller to join a provisioned mesh network that is associated with a local area network, wherein sending the network credentials to the controller triggers the controller to send the network credentials to other controllers using the unprovisioned mesh network before leaving the unprovisioned mesh network.

16. The non-transitory computer readable medium of claim 15, wherein identifying the wireless network comprises identifying an existing provisioned mesh network that is associated with the local area network, and wherein the processor is further configured to:

determine a number of remaining controllers in the unprovisioned mesh network; and send the network credentials to a plurality of the remaining controllers in the unprovisioned mesh network to join the provisioned mesh network, wherein sending the network credentials to the remaining controllers triggers the remaining controllers to send the network credentials to the other controllers using the unprovisioned mesh network before leaving the unprovisioned mesh network.

17. The non-transitory computer readable medium of claim 15, wherein identifying the wireless network comprises:

identifying a plurality of available wireless networks that are in range of the one or more controllers of the plurality of controllers that are members of the unprovisioned mesh network; and selecting a known wireless network that is associated with the local area network from among the plurality of available wireless networks.

18. The non-transitory computer readable medium of claim 15, wherein identifying the wireless network comprises:

determining signal strengths for a plurality of available wireless network that are in range of the one or more controllers of the controllers that are members of the unprovisioned mesh network; and selecting a wireless network with the greatest signal strength from among the plurality of available wireless networks.

19. The non-transitory computer readable medium of claim 15, wherein obtaining the network credentials for the identified wireless network comprises obtaining the network credential from a memory.

20. The non-transitory computer readable medium of claim 15, wherein obtaining the network credentials for the identified wireless network comprises:

prompting a user to provide the network credentials; and the network credentials as a user input.

* * * * *